United States Patent
Dauneria et al.

(10) Patent No.: US 12,149,930 B2
(45) Date of Patent: Nov. 19, 2024

(54) INTERNET PROTOCOL (IP) MULTIMEDIA SUBSYSTEM SESSION (IMS) SLICING-ENABLED IMS VOICE SESSIONS BETWEEN AUTONOMOUS MACHINES AND VOICE SUPPORT SERVICES

(71) Applicant: Telefonaktiebolaget LM Ericsson (publ), Stockholm (SE)

(72) Inventors: Ankur Dauneria, New Delhi (IN); George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 17/615,188

(22) PCT Filed: Jun. 5, 2019

(86) PCT No.: PCT/IB2019/054691
§ 371 (c)(1),
(2) Date: Nov. 30, 2021

(87) PCT Pub. No.: WO2020/245634
PCT Pub. Date: Dec. 10, 2020

(65) Prior Publication Data
US 2022/0232376 A1    Jul. 21, 2022

(51) Int. Cl.
*H04W 12/06* (2021.01)
*G10L 17/04* (2013.01)
(Continued)

(52) U.S. Cl.
CPC ............. *H04W 12/06* (2013.01); *G10L 17/04* (2013.01); *G10L 17/06* (2013.01); *G10L 17/22* (2013.01); *H04W 80/04* (2013.01)

(58) Field of Classification Search
CPC ...... H04W 12/06; H04W 80/04; G10L 17/04; G10L 17/06; G10L 17/22; G06F 21/32;
(Continued)

(56) References Cited

U.S. PATENT DOCUMENTS

| | | | |
|---|---|---|---|
| 2012/0249298 A1* | 10/2012 | Sovio | G07C 9/37 340/5.82 |
| 2016/0048667 A1 | 2/2016 | Kao | |

(Continued)

FOREIGN PATENT DOCUMENTS

WO    2018/148011 A1    8/2018

OTHER PUBLICATIONS

Invitation to Pay Additional Fees and, Where Applicable, Protest Fee dated Jan. 30, 2020 issued in PCT Application No. PCT/IB2019/054691, consisting of 16 pages.
(Continued)

*Primary Examiner* — Don N Vo
(74) *Attorney, Agent, or Firm* — Sage Patent Group

(57) ABSTRACT

Apparatuses and methods for IMS slicing-enabled IMS voice sessions between autonomous machines and/or voice related services. A method for a first user equipment, UE, for authenticating the first UE is provided. An alert voice call is communicated to a second UE for initiating authentication of the first UE. A voiceprint of a user for the authentication of the first UE is communicated, via an IMS slice, and based at least in part on an analysis of the voiceprint, an authentication success message or an authentication fail message is received. A method for an Application Server includes receiving, via an IMS slice, a voiceprint of a user. The voiceprint is compared to a voiceprint sample. The voiceprint sample is associated with the first UE. Based at least in part on the comparison, an authentication success message or an authentication fail message is communicated.

13 Claims, 16 Drawing Sheets

(51) Int. Cl.
    *G10L 17/06* (2013.01)
    *G10L 17/22* (2013.01)
    *H04W 80/04* (2009.01)
(58) Field of Classification Search
    CPC ............ H04L 63/0861; H04L 65/1063; H04L 65/1069; H04L 65/1073; H04L 65/1104; H04L 65/80; H04L 65/1016
    USPC ........................................................ 455/411
    See application file for complete search history.

(56) References Cited

U.S. PATENT DOCUMENTS

2017/0093929 A1\* 3/2017 Hockey ............... H04L 65/1053
2018/0124604 A1\* 5/2018 Rajadurai ........... H04W 12/086

OTHER PUBLICATIONS

International Search Report and Written Opinion dated Mar. 25, 2020 issued in PCT Application No. PCT/IB2019/054691, consisting of 21 pages.
3GPP TR 22.823 V16.1.0 (Jun. 2018), 3rd Generation Partnership Project; Technical Specification Group Services and System Aspects; Study on Enhancements to IMS for New Real Time Communication Services; Stage 1 (Release 16), consisting of 19 pages.
3GPP TR 23.794 V1.0.0 (Mar. 2019), 3rd Generation Partnership Project; Technical Specification Group Services and System Aspects; Study on Enhanced IMS to 5GC Integration (Release 16), consisting of 83 pages.
3GPP TS 23.501 V15.3.0 (Sep. 2018), 3rd Generation Partnership Project; Technical Specification Group Services and System Aspects; System Architecture for the 5G System; Stage 2 (Release 15), consisting of 226 pages.

\* cited by examiner

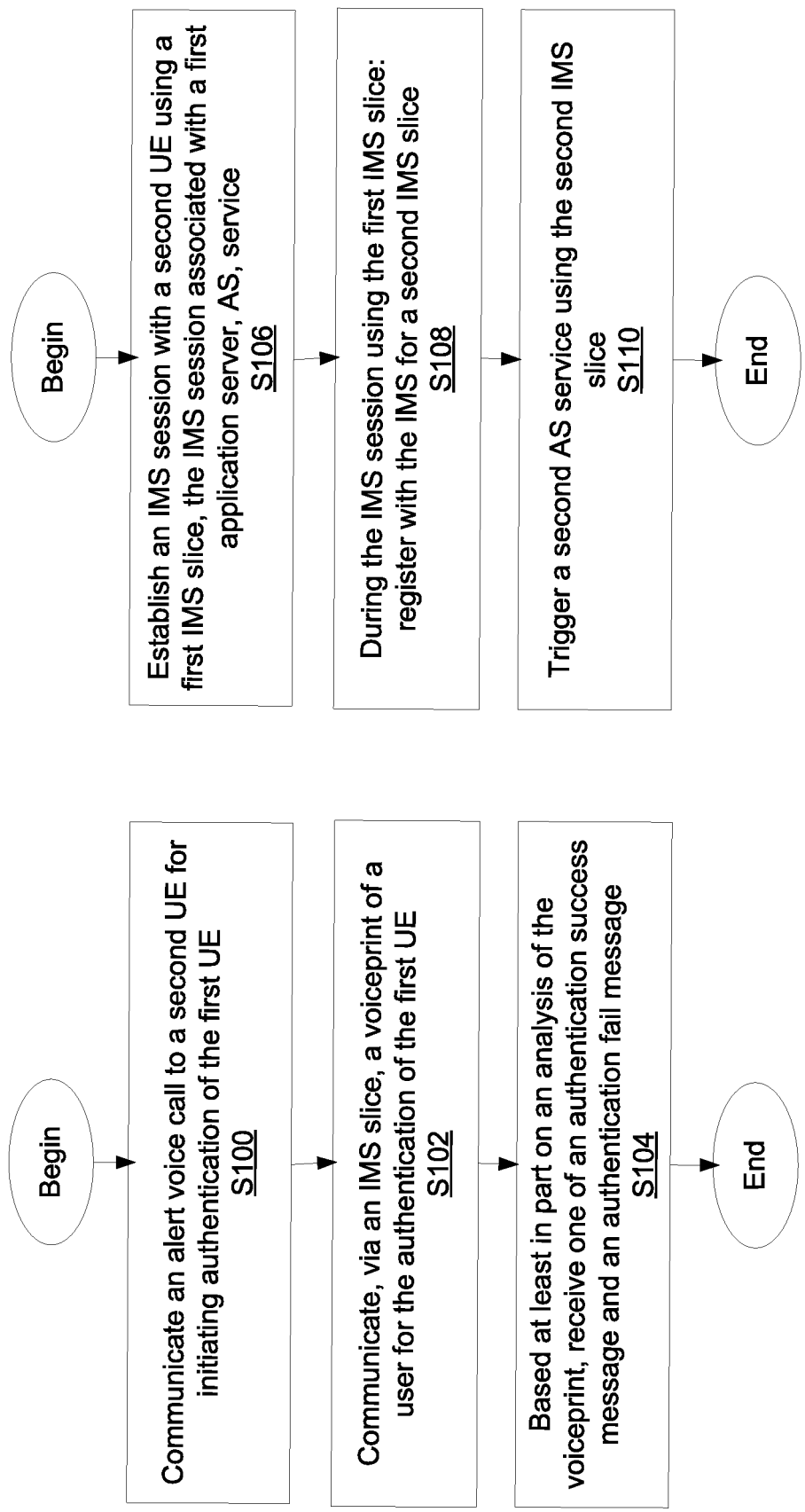

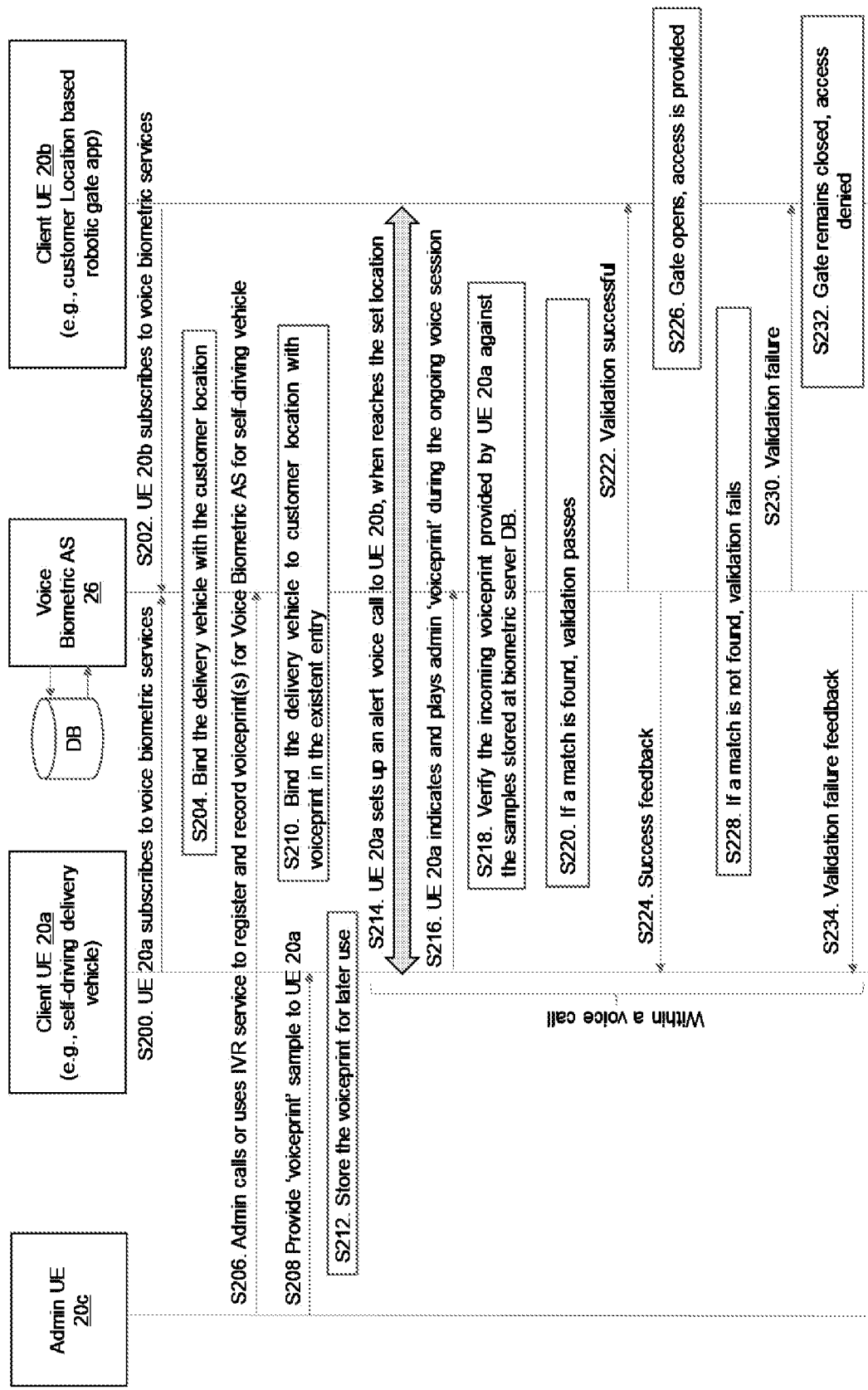

INTERNET PROTOCOL (IP) MULTIMEDIA SUBSYSTEM SESSION (IMS) SLICING-ENABLED IMS VOICE SESSIONS BETWEEN AUTONOMOUS MACHINES AND VOICE SUPPORT SERVICES

CROSS-REFERENCE TO RELATED APPLICATIONS

This application is a Submission Under 35 U.S.C. § 371 for U.S. National Stage Patent Application of International Application Number: PCT/IB2019/054691, filed Jun. 5, 2019 entitled "INTERNET PROTOCOL (IP) MULTIMEDIA SUBSYSTEM SESSION (IMS) SLICING-ENABLED IMS VOICE SESSIONS BETWEEN AUTONOMOUS MACHINES AND VOICE SUPPORT SERVICES," the entirety of which is incorporated herein by reference.

TECHNICAL FIELD

Wireless communication and in particular, methods and apparatuses for Internet Protocol (IP) Multimedia Subsystem (IMS) voice sessions between autonomous machines and/or voice support services.

BACKGROUND

The IP Multimedia Subsystem (hereinafter IMS) enables operators of a Public Land Mobile Network (hereinafter PLMN) to provide their subscribers with multimedia services based and built on Internet applications, services and protocols. Different services and applications can be offered on top of IMS. In particular, voice-related services are an area of interest for network operators and industry partners.

SUMMARY

Some embodiments advantageously provide methods and apparatuses for IMS slicing-enabled IMS voice sessions between autonomous machines and/or voice support services.

According to a first aspect of the present disclosure, a method for a first user equipment, UE, for authenticating the first UE via an Internet Protocol, IP, Multimedia Subsystem, IMS, is provided. The method includes communicating an alert voice call to a second UE for initiating authentication of the first UE. The method includes communicating, via an IMS slice, a voiceprint of a user for the authentication of the first UE. The method includes, based at least in part on an analysis of the voiceprint, receiving one of an authentication success message and an authentication fail message.

In some embodiments of the first aspect, at least one of the first UE and the second UE comprises an autonomous machine configured to communicate via a voice session using the IMS. In some embodiments of the first aspect, the communicating the alert voice call to the second UE further includes communicating the alert voice call to the second UE for authenticating the first UE using an alert IMS slice, the alert IMS slice corresponding to an IMS voice session without at least one of user plane and a Quality-of-Service, QoS, resources. In some embodiments of the first aspect, the method includes registering with the IMS for an alert IMS slice. In some embodiments of the first aspect, the method includes receiving and storing the voiceprint of the user for the authenticating the first UE via the IMS. In some embodiments of the first aspect, the method includes subscribing to an application server, AS, the AS providing a voice biometrics service for authenticating the first UE to the second UE. In some embodiments of the first aspect, the communicating the voiceprint of the user further includes communicating the voiceprint using a session initiation protocol, SIP, message during a voice call session with the second UE. In some embodiments, the method includes if the authentication success message is received, expecting the second UE to perform a first operation; and if the authentication fail message is received, expecting the second UE to perform a second operation, different from the first operation.

According to a second aspect of the present disclosure, a method for an Application Server, AS in an Internet Protocol, IP, Multimedia Subsystem, IMS, is provided. The method includes receiving, via an IMS slice, a voiceprint of a user. The method includes comparing the received voiceprint to a voiceprint sample, the voiceprint sample associated with a first user equipment, UE. The method includes, based at least in part on the comparison, communicating one of an authentication success message and an authentication fail message.

In some embodiments of the second aspect, the comparing the received voiceprint to the voiceprint sample further includes comparing the received voiceprint to the voiceprint sample based at least in part on a condition, the condition including whether the first UE is bound to a second UE, the second UE requesting authentication; and if the condition is met: accessing the voiceprint sample associated with the first UE from a voiceprint database; and analyzing the received voiceprint to determine whether at least one vocal characteristic of the received voiceprint matches a corresponding at least one vocal characteristic of the voiceprint sample. In some embodiments of the second aspect, the communicating further includes if the received voiceprint matches the voiceprint sample, communicating the authentication success message to the first UE; and if the received voiceprint does not match the voiceprint sample, communicating the authentication fail message to the first UE. In some embodiments of the second aspect, the first UE includes an autonomous machine configured to communicate with a second UE via a voice session using the IMS. In some embodiments of the second aspect, the method further includes receiving, from the first UE, a request to subscribe to a voice biometrics service provided by the AS; receiving, from the second UE, a request to subscribe to the voice biometrics service provided by the AS; and obtaining the voiceprint sample from the user and binding the voiceprint sample to information associated with the first UE and the second UE in a voiceprint database. In some embodiments of the second aspect, the receiving the voiceprint of the user further comprises receiving the voiceprint via a session initiation protocol, SIP, message during a voice call session between the first UE and a second UE.

According to a third aspect of the present disclosure, a method for a Proxy-Call Session Control Function, P-CSCF, server for an Internet Protocol, IP, Multimedia Subsystem, IMS, is provided. The method includes receiving, from a first user equipment, UE, a message to establish an IMS voice session with a second UE. The method includes determining whether the message includes an indication of an alert IMS slice. The method includes if the message includes the indication of the alert IMS slice, establishing the IMS voice session without reserving at least one of user plane and a Quality-of-Service, QoS, resources.

In some embodiments of the third aspect, the indication of the alert IMS slice includes at least one of: session description protocol, SDP, information included in a session initiation protocol, SIP, INVITE message, the SDP information indicating use of the alert IMS slice to establish the IMS voice session without the reserving; a feature tag indicating use of the alert IMS slice to establish the IMS voice session without the reserving; an SDP parameter indicating use of the alert IMS slice to establish the IMS voice session and a 0 bit audio rate in the SDP information.

According to a fourth aspect of the present disclosure, a method for a Serving-Call Session Control Function, S-CSCF, server for an Internet Protocol, IP, Multimedia Subsystem, IMS, is provided. The method includes receiving, from a Proxy-Call Session Control Function, P-CSCF, server, a message identifying an IMS voice session established between a first user equipment, UE, and a second UE. The method includes if the message includes an indication that the IMS voice session was established with an alert IMS slice, initiating charging for the alert IMS slice that is different from a charge for a non-alert IMS voice session.

In some embodiments of the fourth aspect, the alert IMS slice corresponds to an IMS voice session without at least one of user plane and a Quality-of Service, QoS, resources.

According to a fifth aspect of the present disclosure, a method for a first user equipment, UE, for communicating via an Internet Protocol, IP, Multimedia Subsystem, IMS, is provided. The method includes establishing an IMS session with a second UE using a first IMS slice, the IMS session associated with a first application server, AS, service. The method includes during the IMS session using the first IMS slice: registering with the IMS for a second IMS slice; and triggering a second AS service using the second IMS slice.

In some embodiments of the fifth aspect, the establishing the IMS session further includes establishing an IMS voice session with the second UE using the first IMS slice, the first AS service including a multimedia telephony service. In some embodiments of the fifth aspect, the second AS service uses data from the first AS service to support the IMS voice session. In some embodiments of the fifth aspect, the triggering the second AS service using the second IMS slice further includes communicating, via the second IMS slice, a session initiation protocol, SIP, message using a public service identity, PSI, identifying the second AS, the SIP message including at least one media bit from the IMS session associated with the first IMS slice. In some embodiments of the fifth aspect, the triggering the second AS service using the second IMS slice further includes establishing a message session relay protocol, MSRP, session with the second AS using the second IMS slice.

According to a sixth aspect of the present disclosure, a first user equipment, UE, for authenticating the first UE via an Internet Protocol, IP, Multimedia Subsystem, IMS, is provided. The first UE includes processing circuitry having a processor and a memory, the memory containing instructions executable by the processor to configure the first UE to: communicate an alert voice call to a second UE for initiating authentication of the first UE; communicate, via an IMS slice, a voiceprint of a user for the authentication of the first UE; and based at least in part on an analysis of the voiceprint, receive one of an authentication success message and an authentication fail message.

In some embodiments of the sixth aspect, at least one of the first UE and the second UE comprises an autonomous machine configured to communicate via a voice session using the IMS. In some embodiments of the sixth aspect, the memory contains further instructions executable by the processor to configure the first UE to communicate the alert voice call to the second UE by configuring the first UE to communicate the alert voice call to the second UE for authenticating the first UE using an alert IMS slice, the alert IMS slice corresponding to an IMS voice session without at least one of user plane and a Quality-of Service, QoS, resources. In some embodiments of the sixth aspect, the memory contains further instructions executable by the processor to configure the first UE to one or more of: register with the IMS for an alert IMS slice; receive and store the voiceprint of the user for authenticating the first UE via the IMS; and subscribe to an application server, AS, the AS providing a voice biometrics service for authenticating the first UE to the second UE. In some embodiments of the sixth aspect, the memory contains further instructions executable by the processor to configure the first UE to communicate the voiceprint of the user by configuring the first UE to communicate the voiceprint using a session initiation protocol, SIP, message during a voice call session with the second UE. In some embodiments of the sixth aspect, the memory contains further instructions executable by the processor to configure the first UE to: if the authentication success message is received, expect the second UE to perform a first operation; and if the authentication fail message is received, expect the second UE to perform a second operation, different from the first operation.

According to a seventh aspect of the present disclosure, an Application Server, AS in an Internet Protocol, IP, Multimedia Subsystem, IMS, is provided. The AS includes processing circuitry having a processor and a memory, the memory containing instructions executable by the processor to configure the AS to: receive, via an IMS slice, a voiceprint of a user; compare the received voiceprint to a voiceprint sample, the voiceprint sample associated with a first user equipment, UE; and based at least in part on the comparison, communicate one of an authentication success message and an authentication fail message.

In some embodiments of the seventh aspect, the memory contains further instructions executable by the processor to configure the AS to compare the received voiceprint to the voiceprint sample by configuring the AS to: compare the received voiceprint to the voiceprint sample based at least in part on a condition, the condition including whether the first UE is bound to a second UE, the second UE requesting authentication; and if the condition is met: access the voiceprint sample associated with the first UE from a voiceprint database; and analyze the received voiceprint to determine whether at least one vocal characteristic of the received voiceprint matches a corresponding at least one vocal characteristic of the voiceprint sample. In some embodiments of the seventh aspect, the memory contains further instructions executable by the processor to configure the AS to communicate by configuring the AS: if the received voiceprint matches the voiceprint sample, communicate the authentication success message to the first UE; and if the received voiceprint does not match the voiceprint sample, communicate the authentication fail message to the first UE. In some embodiments of the seventh aspect, the first UE comprises an autonomous machine configured to communicate with a second UE via a voice session using the IMS. In some embodiments of the seventh aspect, the memory contains further instructions executable by the processor to configure the AS to: receive, from the first UE, a request to subscribe to a voice biometrics service provided by the AS; receive, from the second UE, a request to subscribe to the voice biometrics service provided by the AS; and obtain the voiceprint sample from the user and bind the voiceprint sample to information associated with the first UE and the second UE in a voiceprint database. In some embodiments of the seventh aspect, the memory contains further instructions executable by the processor to configure the AS to receive the voiceprint of the user by configuring the AS to receive the voiceprint via a session initiation protocol, SIP, message during a voice call session between the first UE and a second UE.

According to an eighth aspect of the present disclosure, a Proxy-Call Session Control Function, P-CSCF, server for an Internet Protocol, IP, Multimedia Subsystem, IMS, is provided. The P-CSCF server includes processing circuitry having a processor and a memory, the memory containing instructions executable by the processor to configure the P-CSCF server to receive, from a first user equipment, UE, a message to establish an IMS voice session with a second UE; determine whether the message includes an indication of an alert IMS slice; and if the message includes the indication of the alert IMS slice, establish the IMS voice session without reserving at least one of user plane and a Quality-of Service, QoS, resources.

In some embodiments of the eighth aspect, the indication of the alert IMS slice includes at least one of: session description protocol, SDP, information included in a session initiation protocol, SIP, INVITE message, the SDP information indicating use of the alert IMS slice to establish the IMS voice session without the reserving; a feature tag indicating use of the alert IMS slice to establish the IMS voice session without the reserving; an SDP parameter indicating use of the alert IMS slice to establish the IMS voice session and a 0 bit audio rate in the SDP information.

According to a ninth aspect of the present disclosure, a Serving-Call Session Control Function, S-CSCF, server for an Internet Protocol, IP, Multimedia Subsystem, IMS, is provided. The S-CSCF server includes processing circuitry having a processor and a memory, the memory containing instructions executable by the processor to configure the S-CSCF server to: receive, from a Proxy-Call Session Control Function, P-CSCF, server, a message identifying an IMS voice session established between a first user equipment, UE, and a second UE; and if the message includes an indication that the IMS voice session was established with an alert IMS slice, initiate charging for the alert IMS slice that is different from a charge for a non-alert IMS voice session.

In some embodiments of the ninth aspect, the alert IMS slice corresponds to an IMS voice session without at least one of user plane and a Quality-of Service, QoS, resources.

According to a tenth aspect of the present disclosure, a first user equipment, UE, for communicating via an Internet Protocol, IP, Multimedia Subsystem, IMS, is provided. The first UE includes processing circuitry having a processor and a memory, the memory containing instructions executable by the processor to configure the first UE to: establish an IMS session with a second UE using a first IMS slice, the IMS session associated with a first application server, AS, service; and during the IMS session using the first IMS slice to: register with the IMS for a second IMS slice; and trigger a second AS service using the second IMS slice.

In some embodiments of the tenth aspect, the memory contains further instructions executable by the processor to configure the first UE to establish the IMS session by configuring the first UE to establish an IMS voice session with the second UE using the first IMS slice, the first AS service including a multimedia telephony service. In some embodiments of the tenth aspect, the second AS service uses data from the first AS service to support the IMS voice session. In some embodiments of the tenth aspect, the memory contains further instructions executable by the processor to configure the first UE to the trigger the second AS service using the second IMS slice by configuring the first UE to communicate, via the second IMS slice, a session initiation protocol, SIP, message using a public service identity, PSI, identifying the second AS, the SIP message including at least one media bit from the IMS session associated with the first IMS slice. In some embodiments of the tenth aspect, the memory contains further instructions executable by the processor to configure the first UE to the trigger the second AS service using the second IMS slice by configuring the first UE to establish a message session relay protocol, MSRP, session with the second AS using the second IMS slice.

According to an eleventh aspect of the present disclosure, a system for communicating via an Internet Protocol, IP, Multimedia Subsystem, IMS, is provided. The system includes a first user equipment, UE, configured to communicate an alert voice call to a second UE for initiating authentication of the first UE; communicate, via an IMS slice, a voiceprint of a user for the authentication of the first UE; and based at least in part on an analysis of the voiceprint, receive one of an authentication success message and an authentication fail message. The system includes an application server, AS, configured to receive, via the IMS slice, the voiceprint of the user; compare the received voiceprint to a voiceprint sample, the voiceprint sample associated with the first UE; and based at least in part on the comparison, communicate the one of the authentication success message and the authentication fail message. The system includes a Proxy-Call Session Control Function, P-CSCF, server configured to receive, from the first UE, a message to establish an IMS voice session with the second UE; determine whether the message includes an indication of an alert IMS slice; and if the message includes the indication of the alert IMS slice, establish the IMS voice session for the alert voice call without reserving at least one of user plane and a Quality-of Service, QoS, resources. The system includes a Serving-Call Session Control Function, S-CSCF, server configured to receive, from the P-CSCF, server, a message identifying an IMS voice session established between the UE and the second UE, the IMS voice session corresponding to the alert voice call; and if the message includes an indication that the IMS voice session was established with the alert IMS slice, initiate charging for the alert IMS slice that is different from a charge for a non-alert IMS voice session.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart of an exemplary process in a user equipment for Alerter according to some embodiments of the present disclosure;

FIG. 7 is a flowchart of an exemplary process in a user equipment for Mid-session servicer according to some embodiments of the present disclosure;

FIG. 14 is a flowchart for an exemplary process for voice biometrics services according to some embodiments of the present disclosure.

DETAILED DESCRIPTION

Machines, and, in particular, autonomous machines may be joining the ecosystem as part of different verticals. Thus, communication between machines using operator-supported communication services is an interest area. Voice-related platforms may be heading in directions where device-to-device talk can occur via voice. For example, voice commands may flow between devices (e.g., between user equipments (UEs)). For example, smart speaker assistants (e.g., Alexa and Cortana) may be able to communicate with one other. Accordingly, it may be desired to allow autonomous machines as part of different verticals to communicate with one another over a voice call session. Example use cases are described below and may indicate the future scope of voice call sessions between autonomous machines.

Use case 1: sending and receiving voice activated commands and related acknowledgements over a ring-less voice call session between two autonomous machines.

Speech recognition devices (e.g., Google Home, Alexa, etc.) are already flooding the consumer domain. Apart from the consumer domain, it may be a matter of time when these services start to customize for other domains, such as industrial domains. For example, voice activated commands may flow between machines. However, in such ecosystem ring-less voice calls may be developed to allow a machine to make a ring-less call to another machine and communicate (e.g., spell) a voice activated command over the call session and/or receive a related acknowledgment. Machines may not need ring tones like humans, therefore, in some embodiments, machines may be able to receive an 'alert' via a ring-less 'call' in order to create a noise-free alert environment.

Figure 1:
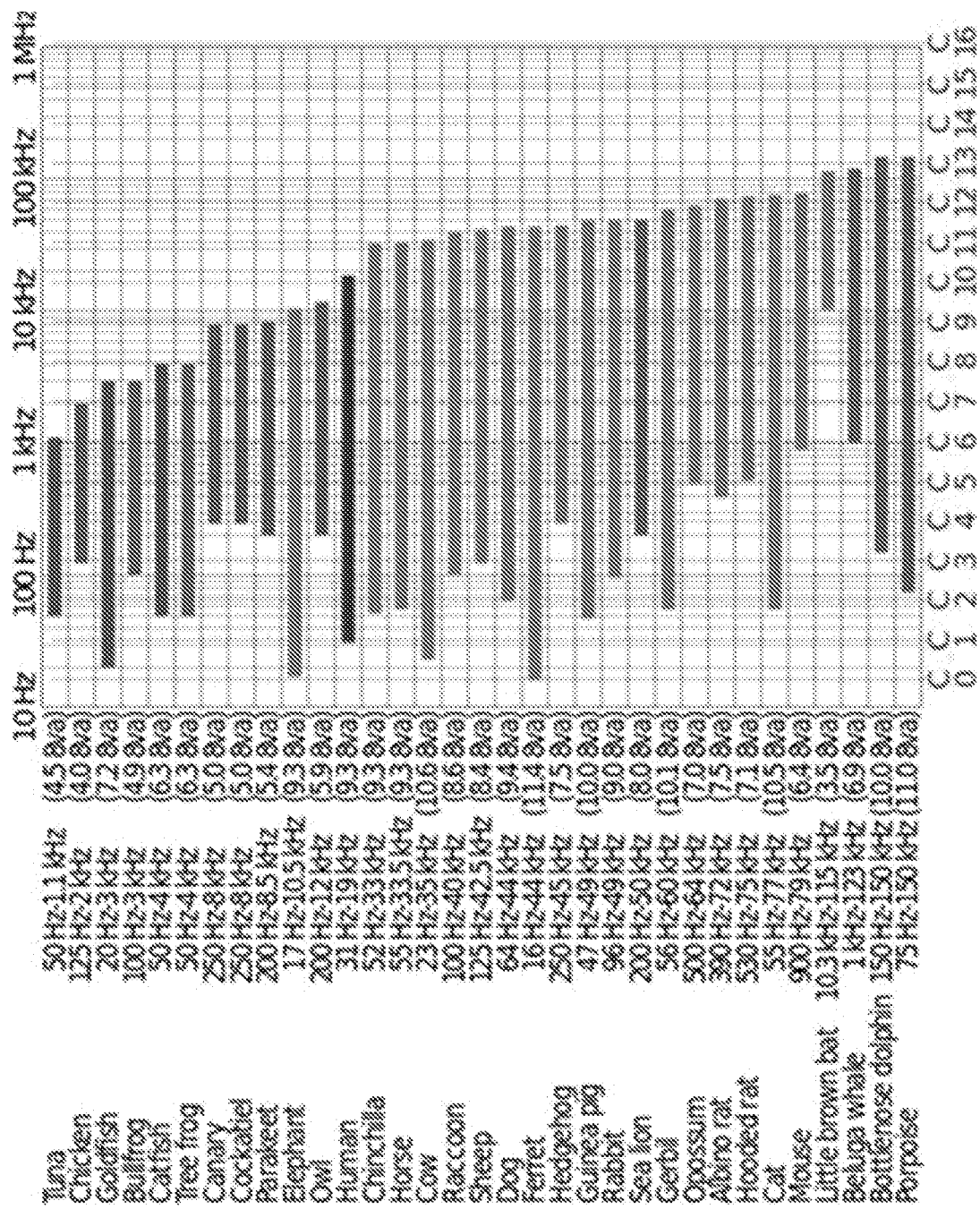
FIG. 1 illustrates an example of the hearing range of different animals.

Further, human hearing range is 20 Hz to 20,000 Hz, i.e., humans can hear voice in this hearing range. Animals have different hearing ranges as shown, for example, in FIG. 1. Therefore, machine communications can be configured to communicate in a hearing range (Hz) as per the requirements of a particular, customized environment so that, for example, sending and receiving of voice activated commands between machines over a ring-less voice call session will not impact the work floor environment (e.g., generate noise pollution) for humans who are also sharing the work environment with autonomous machines.

Use case 2: voice biometrics between autonomous machines over a voice call session.

Figure 2:
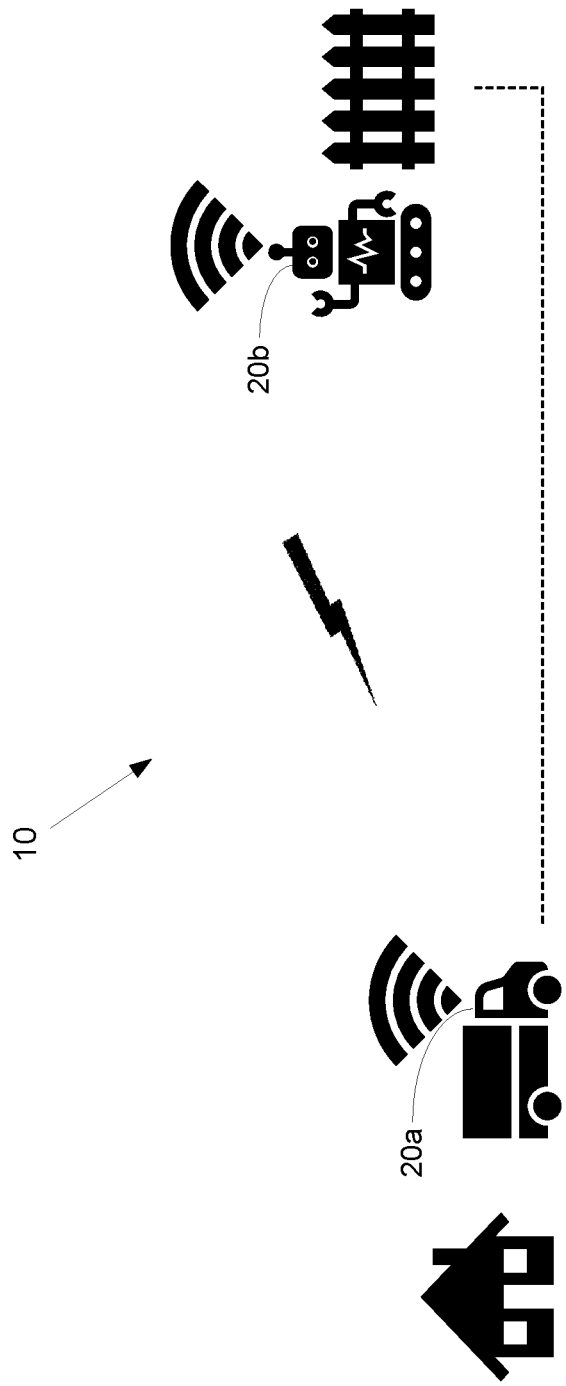
FIG. 2 illustrates an example smart factory warehouse and delivery system.

In one example of this use case, a delivery chain-related vehicle (which may be considered to be or to include an autonomous UE) identifies itself, or verifies its identity at customer locations over a voice call session. For example, as depicted in FIG. 2, a system 10 may include a self-driving vehicle (e.g., UE 20a), which may be part of a smart delivery management system, picks up goods from a smart factory warehouse and delivers the goods to customer locations. A customer, or a robot (e.g., UE 20b) at the customer location may receive the deliveries. An autonomous machine (e.g., the self-driving vehicle UE 20a) reaching the customer location may be required to identify itself in order for the goods to be accepted. In such situations, the self-driving vehicle (e.g., UE 20a) can communicate using data services or via voice call (e.g., if data services are impacted due to network outage at customer locations) so that the autonomous machine (e.g., the self-driving vehicle UE 20a) can identify itself to the robot (e.g., UE 20b) over a voice call session.

A customer accepting the deliveries may deploy smart applications that have both capabilities for voice and data, which can automatically open the gates for truck deliveries to enter the facilities once the self-driving truck successfully identifies itself over e.g. a voice call session. Thus, in this use case, two autonomous machines (UE 20a: self-driving factory vehicle, UE 20b: robot or customer location-based UE with autonomous identifying application) may use voice call for delivery identification and acceptance.

Thus, voice activated commands over a ring-less voice call session can be utilized by machines (e.g., autonomous machines) to provide identification using, for example, a hearing range customized for the particular environment. In some embodiments, an authorized human user can provide a voiceprint (e.g., authorized human voice sample) to the autonomous vehicle (e.g., UE 20a), which after reaching the customer location can, for example, dial the robot application (e.g., UE 20b) at the customer location gate and provide the voiceprint for authenticating the autonomous vehicle over a voice call. Once authenticated, the robot application (e.g., UE 20b) opens the gate.

Some embodiments of the present disclosure enable device-to-device voice session communication between autonomous machines. Further, by tweaking the audible range of voice to be used between devices, such communication may further be customized to a slightly non-audible range for human (e.g., based on the ranges depicted in FIG. 1) thereby reducing noise pollution concerns if any.

Use case 3: mid-session voice services for users (e.g., human users) engaged in a telephony communication.

Examples of these services include services such as language translation of an ongoing conversation from one language to another, or conversion of an ongoing IMS audio session to text for a printout script, or recording the session. These services are on demand typically and invoked by one of the party's mid-session in an ongoing telephony session. Currently, to perform these mid-session services during an ongoing telephony session requires external equipment, and much more technical knowledge from users, etc. Thus, some embodiments of the present disclosure enable mid-session services during an ongoing telephony session (e.g., without specialized equipment or additional technical knowledge from users).

Unfortunately, the above use cases for autonomous machine communications are not supported in existing networks. Similarly, real-time mid-session voice assisted services are not adequately supported by existing networks.

In some embodiments, network slicing in IMS ("IMS slicing"), or IMS partitioning may be used to enable the invocation of real-time IMS-based voice services mid-session during an IMS telephony session, as well as enabling support for autonomous machine communication over a voice session. As an example, a user interested in recording his ongoing Voice-over-Long Term Evolution (VoLTE) IMS audio session (or Voice-over-New-Radio (VoNR)) may activate an IMS-based service for recording the ongoing session by using, from the UE 20, a new IMS slice dedicated for this service (e.g., assuming that an operator provides such a service and that the UE supports IMS slicing and enables such a service to be activated from the UE). IMS slicing may allow operators to provide customized IMS networks, based on e.g., service categories, service performance requirements, etc. One IMS slice can be composed of all, or part of the IMS network functional entities. One IMS network can support one or several IMS slices.

Figure 3:
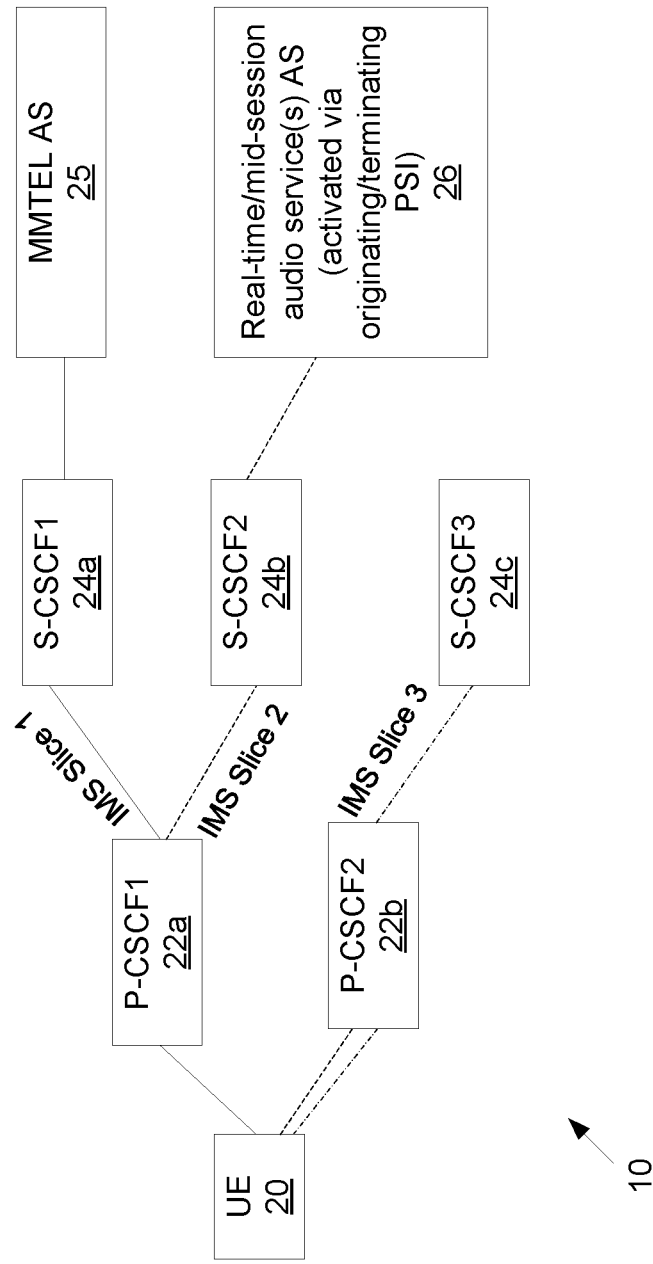
FIG. 3 illustrates an example arrangement for various IMS slices that may be used to implement some of the techniques in the present disclosure.

FIG. 3 depicts an example of IMS slicing. The UE 20 establishes three (3) IMS network slices for three (3) different services. UE 20 is shown connected to two (2) Proxy Serving Call Session Control Functions (P-CSCFs) (P-CSCF1 22*a* and P-CSCF2 22*b*). The P-CSCFs 22*a* and 22*b* are shown connected to three (3) different Serving Call Session Control Functions (S-CSCFs) (S-CSCF1 24*a*, S-CSCF2 24*b* and S-CSCF3 24*c*). The S-CSCFs 24*a*, 24*b* and 24*c* can be used for each of the IMS slices (e.g., IMS slice 1, IMS slice 2 and IMS slice 3)—one IMS slice corresponding to each service (however this need not be the case and is just one example). For example, VoLTE may be provided via one IMS slice, while messaging may be provided via a second IMS slice, etc. In the example in FIG. 3, voice (e.g., provided by a multimedia telephony (MMTel) application server (AS) 25) is provided via IMS slice 1 and a second audio-related service (e.g., translation of ongoing voice session) is provided by AS 26 via IMS slice 2.

Some embodiments of the present disclosure provide for IMS-based services to support, e.g., one or more of the use cases described above, and may use IMS slicing to implement the same. Some embodiments may advantageously provide one or more of the following arrangements and/or benefits:
1. Autonomous machines as part of verticals interacting over voice call sessions. Voice call session between autonomous machines may be customized as different machines may be part of different ASs. Different use cases in which autonomous machines communicate over voice call session could increase the scope for operators, extending the reach of voice services.
2. New subscription plans may be provided for specialized voice services for autonomous machine communication use cases as part of different verticals.
3. Speech recognition service applications in industrial domains may open new voice session opportunities between autonomous machines for network operators.
4. On demand support for real-time mid-session voice services during a multimedia telephony session.

Before describing in detail exemplary embodiments, it is noted that the embodiments reside primarily in combinations of apparatus components and processing steps related to IMS voice sessions between autonomous machines and/or voice support services. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The UE herein can be any type of wireless device capable of communicating with a network node or another UE over radio signals. In some embodiments, the UE may be an autonomous machine configured to communicate via IMS. The UE herein can by any type of communication device capable of communicating with another UE, an application server, a network node, a server, an IMS NF or other IMS network node, via a wired connection and/or a wireless connection. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the phrase "alert IMS" is used (e.g., alert IMS slice, alert IMS voice session) and may be used to indicate an IMS slice for voice services (e.g., indicating a voice activated command) and/or an IMS voice session that is established for alert purposes (e.g., alerting a UE to expect a voice-related message via a different IMS slice) without establishing a user plane and/or without reserving Quality-of Service (QoS) resources.

In some embodiments, the phrase "SIP message" (lowercase "message") is intended broadly to indicate any SIP message. Non-limiting examples of SIP messages include SIP INVITE, SIP MESSAGE, SIP OPTIONS, SIP REGISTER, SIP NOTIFY, SIP INFO, Ringing, 200 OK, etc.

Note that although terminology from one particular wireless system, such as, for example, 3$^{rd}$ Generation Partnership Project (3GPP), Long Term Evolution (LTE), 5$^{th}$ Generation (5G) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a UE 20 or a P-CSCF 22 or S-CSCF 24 or an AS 26 may be distributed over a plurality of UEs 20 and/or a plurality of P-CSCFs 22, a plurality of or S-CSCFs 24 and/or a plurality of ASs 26. In other words, it is contemplated that the functions of the P-CSCF 22, S-CSCF 24, AS 26 and UE 20 described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 4:
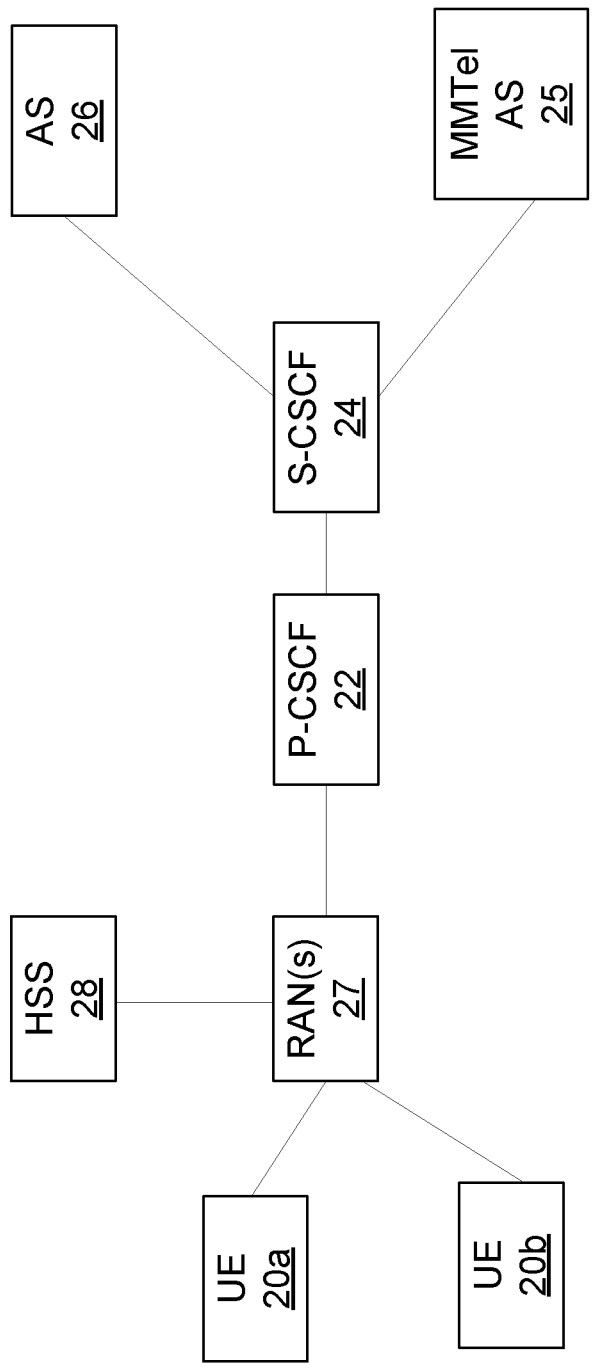
FIG. 4 illustrates another example system architecture according to some embodiments of the present disclosure.

Referring again to the drawing figures, in which like elements are referred to by like reference numerals, there is shown in FIG. 4 a schematic diagram of the communication system 10, according to another embodiment, constructed in accordance with the principles of the present disclosure. The communication system 10 in FIG. 4 is a non-limiting example and other embodiments of the present disclosure may be implemented by one or more other systems and/or networks. Referring to FIG. 4, system 10 includes one or more UEs (e.g., UE 20a, UE 20b, etc., collectively referred to as, UE 20), in addition to various support elements for supporting IMS communications, such as, a radio access network (RAN) 27 (e.g., 5G or NR RAN), which may provide IP connectivity to the UE 20, and a Home Subscriber Server/User Data Management (HSS/UDM) 28 (hereinafter HSS), which may provide a database of subscriber information allowing users to be granted access to the IMS associated with the subscriber's specific information. The system 10 may further includes Proxy-Call Session Control Function (P-CSCF) server 22, which may provide proxy communications between the UE 20 and the IMS via e.g., the RAN. The system 10 further includes Serving-Call Session Control Function (S-CSCF) server 24, which may be an IMS entity assigned to the UE 20 e.g., during IMS registration, and/or may provide for charging for IMS services according to some techniques in the present disclosure. Various application servers may provide different services to the UE 20 via IMS, such as, for example, a multimedia telephony (MMTel) AS providing e.g., VoLTE or VoNR to the UE 20, and application server (AS) 26. In some embodiments, AS 26 may be configured to provide voice biometrics services according to some techniques in the present disclosure. It should be noted that although a single P-CSCF 22 and a single S-CSCF 24 are shown in FIG. 4, the system 10 may include numerous P-CSCFs and S-CSCFs and further UE 20a may access services (e.g., via AS 26 and MMTel AS 25) through a different S-CSCF 24 and P-CSCF 22 than used by UE 20b.

Example implementations, in accordance with an embodiment, of the UE 20, P-CSCF server 22, S-CSCF server 24 and the AS 26 discussed in the preceding paragraphs will now be described with reference to FIG. 5.

The UE 20 includes a communication interface 30, processing circuitry 32, and memory 34. The communication interface 30 may be configured to communicate with the P-CSCF server 22 and/or other elements in the system 10 to facilitate UE 20 access to IMS services, such as, for example, biometrics authentication service provided by AS 26. In some embodiments, the communication interface 30 may be formed as or may include, for example, one or more radio frequency (RF) transmitters, one or more RF receivers, and/or one or more RF transceivers, and/or may be considered a radio interface. In some embodiments, the communication interface 30 may also include a wired interface.

The processing circuitry 32 may include one or more processors 36 and memory, such as, the memory 34. In particular, in addition to a traditional processor and memory, the processing circuitry 32 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 34, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 20 may further include software stored internally in, for example, memory 34, or stored in external memory (e.g., database) accessible by the UE 20 via an external connection. The software may be executable by the processing circuitry 32. The processing circuitry 32 may be configured to control any of the methods and/or processes described herein and/or to cause such methods, and/or processes to be performed, e.g., by the UE 20. The memory 34 is configured to store data, programmatic software code and/or other information described herein. In some embodiments, the software may include instructions stored in memory 34 that, when executed by the processor 36 and/or Alerter 38 and/or Mid-session Servicer 40, causes the processing circuitry 32 and/or configures the UE 20 to perform the processes described herein with respect to the UE 20 (e.g., processes described with reference to FIGS. 6-7 and/or any of the other flowcharts).

The P-CSCF server 22 includes a communication interface 50, processing circuitry 52, and memory 54. The communication interface 50 may be configured to communicate with the UE 20 and/or other elements in the system 10 to facilitate UE 20 access to IMS services. In some embodiments, the communication interface 50 may be formed as or may include, for example, one or more radio frequency (RF) transmitters, one or more RF receivers, and/or one or more RF transceivers, and/or may be considered a radio interface. In some embodiments, the communication interface 50 may also include a wired interface.

The processing circuitry 52 may include one or more processors 56 and memory, such as, the memory 54. In particular, in addition to a traditional processor and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 56 may be configured to access (e.g., write to and/or read from) the memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the P-CSCF server 22 may further include software stored internally in, for example, memory 54, or stored in external memory (e.g., database) accessible by the P-CSCF server 22 via an external connection. The software may be executable by the processing circuitry 52. The processing circuitry 52 may be configured to control any of the methods and/or processes described herein and/or to cause such methods, and/or processes to be performed, e.g., by the P-CSCF server 22. The memory 54 is configured to store data, programmatic software code and/or other information described herein. In some embodiments, the software may include instructions stored in memory 54 that, when executed by the processor 56 and/or Communication manager 58, causes the processing circuitry 52 and/or configures the P-CSCF server 22 to perform the processes described herein with respect to the P-CSCF server 22 (e.g., processes described with reference to FIG. 9 and/or any of the other flowcharts).

The S-CSCF server 24 includes a communication interface 60, processing circuitry 62, and memory 64. The communication interface 60 may be configured to communicate with the UE 20 and/or other elements in the system 10 to facilitate UE 20 access to IMS services. In some embodiments, the communication interface 60 may be formed as or may include, for example, one or more radio frequency (RF) transmitters, one or more RF receivers, and/or one or more RF transceivers, and/or may be considered a radio interface. In some embodiments, the communication interface 60 may also include a wired interface.

The processing circuitry 62 may include one or more processors 66 and memory, such as, the memory 64. In particular, in addition to a traditional processor and memory, the processing circuitry 62 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) the memory 64, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the S-CSCF server 24 may further include software stored internally in, for example, memory 64, or stored in external memory (e.g., database) accessible by the S-CSCF server 24 via an external connection. The software may be executable by the processing circuitry 62. The processing circuitry 62 may be configured to control any of the methods and/or processes described herein and/or to cause such methods, and/or processes to be performed, e.g., by the S-CSCF server 24. The memory 64 is configured to store data, programmatic software code and/or other information described herein. In some embodiments, the software may include instructions stored in memory 64 that, when executed by the processor 66 and/or Charging manager 68, causes the processing circuitry 62 and/or configures the S-CSCF server 24 to perform the processes described herein with respect to the S-CSCF server 24 (e.g., processes described with reference to FIG. 10 and/or any of the other flowcharts).

The AS 26 includes a communication interface 70, processing circuitry 72, and memory 74. The communication interface 70 may be configured to communicate with the UE 20 and/or other elements in the system 10 to facilitate UE 20 access to IMS services. In some embodiments, the communication interface 70 may be formed as or may include, for example, one or more radio frequency (RF) transmitters, one or more RF receivers, and/or one or more RF transceivers, and/or may be considered a radio interface. In some embodiments, the communication interface 70 may also include a wired interface.

The processing circuitry 72 may include one or more processors 76 and memory, such as, the memory 74. In particular, in addition to a traditional processor and memory, the processing circuitry 72 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 76 may be configured to access (e.g., write to and/or read from) the memory 74, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the AS 26 may further include software stored internally in, for example, memory 74, or stored in external memory (e.g., database) accessible by the AS 26 via an external connection. The software may be executable by the processing circuitry 72. The processing circuitry 72 may be configured to control any of the methods and/or processes described herein and/or to cause such methods, and/or processes to be performed, e.g., by the AS 26. The memory 74 is configured to store data, programmatic software code and/or other information described herein. In some embodiments, the software may include instructions stored in memory 74 that, when executed by the processor 76 and/or Biometrics authenticator 78, causes the processing circuitry 72 and/or configures the AS 26 to perform the processes described herein with respect to the AS 26 (e.g., processes described with reference to FIG. 8 and/or any of the other flowcharts).

Figure 5:
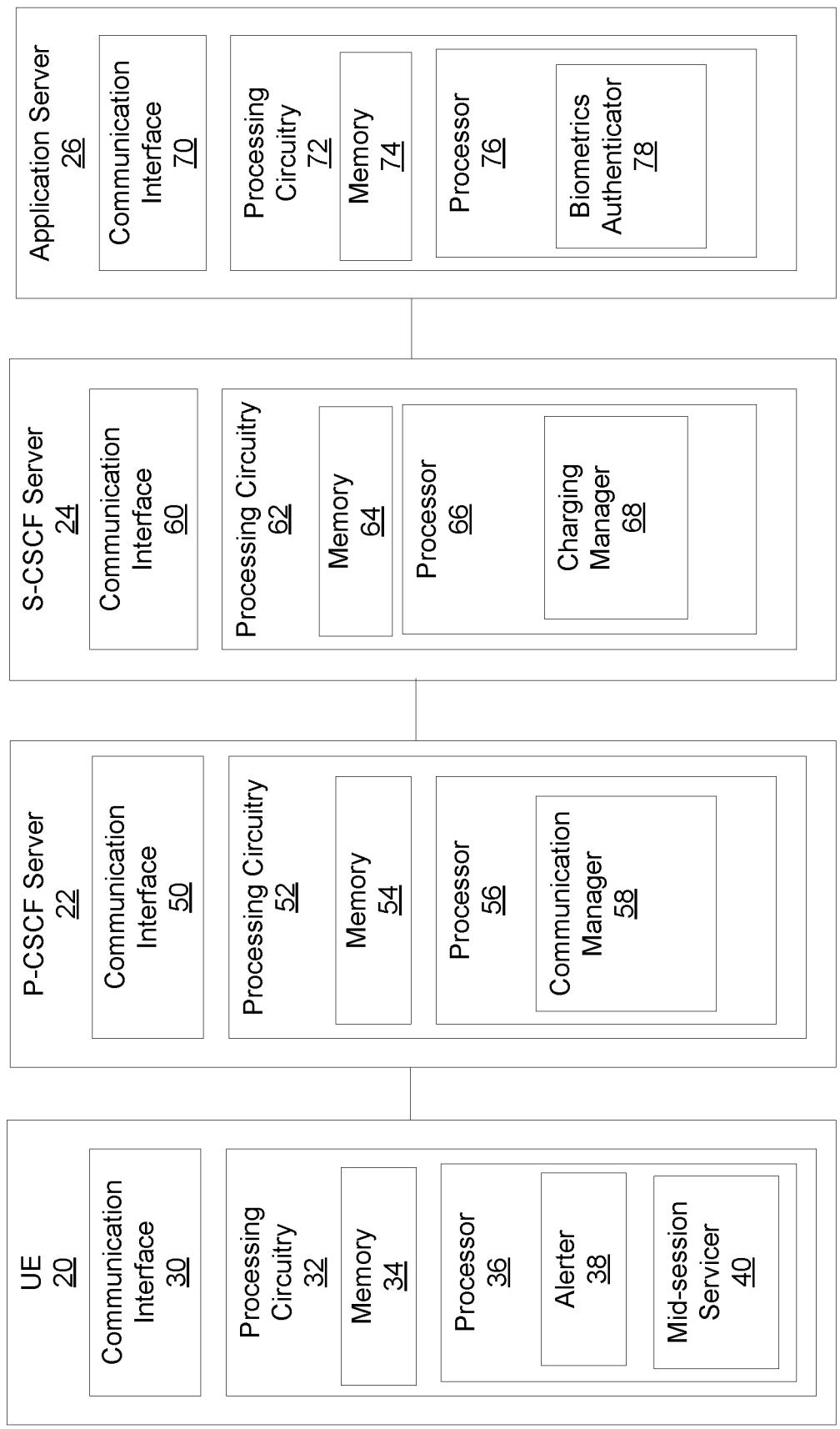
FIG. 5 illustrates yet another example system architecture and example hardware arrangements for devices in the system, according to some embodiments of the present disclosure.

In FIG. 5, the connection between the devices UE 20, P-CSCF server 22, S-CSCF server 24 and AS 26 is shown without explicit reference to any intermediary devices or connections. However, it should be understood that intermediary devices and/or connections may exist between these devices, although not explicitly shown.

Although FIG. 5 shows Alerter 38, Mid-session Servicer 40, Communication manager 58, Charging manager 68 and Biometrics authenticator 78, as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

FIG. 6 is a flowchart of an exemplary process in a first UE 20a for implementing one or more voice-related services according to some embodiments of the present disclosure. One or more Blocks and/or functions and/or methods performed by the UE 20 may be performed by one or more elements of UE 20 such as by Alerter 38 in processing circuitry 32, memory 34, processor 36, communication interface 30, etc. according to the example process/method. The example process includes communicating (Block S100), such as via Alerter 38, processing circuitry 32, memory 34, processor 36, communication interface 30, an alert voice call to a second UE 20b for initiating authentication of the first UE 20a. The process includes communicating (Block S102), via an IMS slice, such as via Alerter 38, processing circuitry 32, memory 34, processor 36, communication interface 30, a voiceprint of a user for the authentication of the first UE 20a. The process includes, based at least in part on an analysis of the voiceprint, receiving (Block S104), such as via Alerter 38, processing circuitry 32, memory 34, processor 36, communication interface 30, one of an authentication success message and an authentication fail message.

In some embodiments, at least one of the first UE 20a and the second UE 20b comprises an autonomous machine configured to communicate via a voice session using the IMS. In some embodiments, the communicating the alert voice call to the second UE 20b further includes communicating, such as via Alerter 38, processing circuitry 32, memory 34, processor 36, communication interface 30, the alert voice call to the second UE 20b for authenticating the first UE 20a using an alert IMS slice, the alert IMS slice corresponding to an IMS voice session without at least one of user plane and a Quality-of Service, QoS, resources. In some embodiments, the process includes registering, such as via Alerter 38, processing circuitry 32, memory 34, processor 36, communication interface 30, with the IMS for an alert IMS slice. In some embodiments, the process includes receiving and storing, such as via Alerter 38, processing circuitry 32, memory 34, processor 36, communication interface 30, the voiceprint of the user for the authenticating the first UE 20a via the IMS. In some embodiments, the process includes subscribing, such as via Alerter 38, processing circuitry 32, memory 34, processor 36, communication interface 30, to an application server, AS 26, the AS providing a voice biometrics service for authenticating the first UE 20a to the second UE 20b. In some embodiments, the communicating the voiceprint of the user further includes communicating, such as via Alerter 38, processing circuitry 32, memory 34, processor 36, communication interface 30, the voiceprint using a session initiation protocol, SIP, message during a voice call session with the second UE 20b. In some embodiments, the process includes if the authentication success message is received, expecting, such as via Alerter 38, processing circuitry 32, memory 34, processor 36, communication interface 30, the second UE 20b to perform a first operation (e.g., permit entrance/open gate, record authentication success event, etc.); and if the authentication fail message is received, expecting the second UE 20b to perform a second operation (e.g., not permit entrance/close gate, record authentication fail event, etc.), different from the first operation. As used herein, "expecting" is used in a broad sense to mean that UE 20a may perform one or another operation (e.g., detect that gate is opening and move through the gate or determine that the gate will not open and turn back around toward another delivery location or back to home base, etc.) based on whether the authentication success or fail message is received.

FIG. 7 is a flowchart of an exemplary process in a first UE 20a for implementing one or more voice-related services according to some embodiments of the present disclosure. One or more Blocks and/or functions and/or methods performed by the UE 20 may be performed by one or more elements of UE 20 such as Mid-session Servicer 40 in processing circuitry 32, memory 34, processor 36, communication interface 30, etc. according to the example process/method. The example process includes establishing (Block S106), such as via Mid-session Servicer 40, processing circuitry 32, memory 34, processor 36, communication interface 30, an IMS session with a second UE 20b using a first IMS slice, the IMS session associated with a first application server, AS, service. The process includes, during the IMS session using the first IMS slice: registering (Block S108), such as via Mid-session Servicer 40, processing circuitry 32, memory 34, processor 36, communication interface 30, with the IMS for a second IMS slice; and triggering (Block S110), such as via Mid-session Servicer 40, processing circuitry 32, memory 34, processor 36, communication interface 30, a second AS service using the second IMS slice.

In some embodiments, the establishing the IMS session further includes establishing, such as via Mid-session Servicer 40, processing circuitry 32, memory 34, processor 36, communication interface 30, an IMS voice session with the second UE 20b using the first IMS slice, the first AS service including a multimedia telephony service. In some embodiments, the second AS service uses data from the first AS service to support the IMS voice session. In some embodiments, the triggering the second AS service using the second IMS slice further includes communicating, via the second IMS slice, such as via Mid-session Servicer 40, processing circuitry 32, memory 34, processor 36, communication interface 30, a session initiation protocol, SIP, message using a public service identity, PSI, identifying the second AS, the SIP message including at least one media bit from the IMS session associated with the first IMS slice. In some embodiments, the triggering the second AS service using the second IMS slice further includes establishing, such as via Mid-session Servicer 40, processing circuitry 32, memory 34, processor 36, communication interface 30, a message session relay protocol, MSRP, session with the second AS using the second IMS slice.

Figure 8:
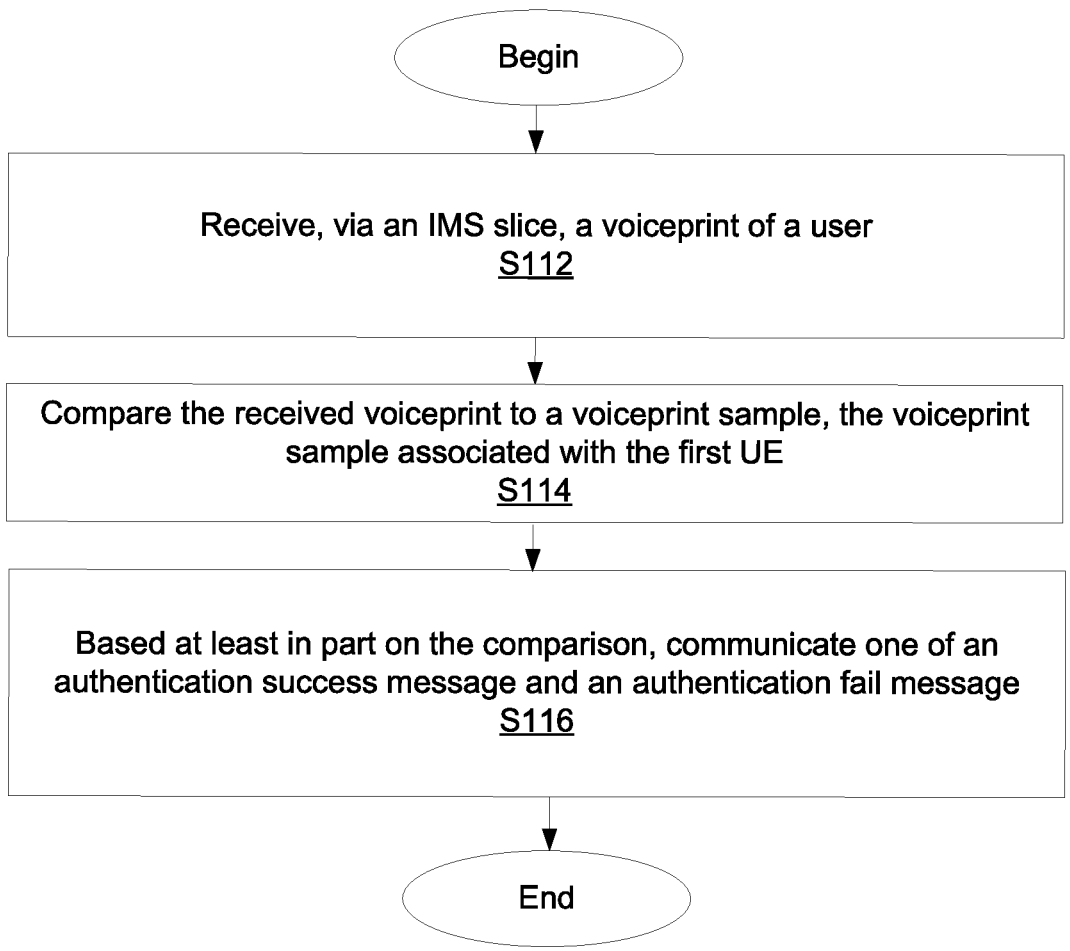
FIG. 8 is a flowchart of an exemplary process in an AS for a Biometrics authenticator according to some embodiments of the present disclosure.

FIG. 8 is a flowchart of an exemplary process in a AS 26 for implementing one or more voice-related services according to some embodiments of the present disclosure. One or more Blocks and/or functions and/or methods performed by the AS 26 may be performed by one or more elements of AS 26 such as by Biometrics authenticator 78 in processing circuitry 72, memory 74, processor 76, communication interface 70, etc. according to the example process/method. The example process includes receiving, via an IMS slice, (Block S112), such as via Biometrics authenticator 78, processing circuitry 72, memory 74, processor 76, communication interface 70, a voiceprint of a user (e.g., from UE 20b or UE 20a). The process includes comparing (Block S114), such as via Biometrics authenticator 78, processing circuitry 72, memory 74, processor 76, communication interface 70, the received voiceprint to a voiceprint sample, the voiceprint sample associated with the first UE 20a. The process includes, based at least in part on the comparison, communicating (Block S116), such as via Biometrics authenticator 78, processing circuitry 72, memory 74, processor 76, communication interface 70, one of an authentication success message and an authentication fail message.

In some embodiments, the comparing the received voiceprint to the voiceprint sample further includes comparing the received voiceprint to the voiceprint sample based at least in part on a condition, the condition including whether the first UE 20*a* is bound to a second UE 20*b*, the second UE 20*b* requesting authentication; and if the condition is met: accessing, such as via Biometrics authenticator 78, processing circuitry 72, memory 74, processor 76, communication interface 70, the voiceprint sample associated with the first UE 20*a* from a voiceprint database (e.g., memory 74) and analyzing, such as via Biometrics authenticator 78, processing circuitry 72, memory 74, processor 76, communication interface 70, the received voiceprint to determine whether at least one vocal characteristic of the received voiceprint matches a corresponding at least one vocal characteristic of the voiceprint sample. In some embodiments, the communicating further includes if the received voiceprint matches the voiceprint sample, communicating, such as via Biometrics authenticator 78, processing circuitry 72, memory 74, processor 76, communication interface 70, the authentication success message to the first UE 20*a*; and if the received voiceprint does not match the voiceprint sample, communicating, such as via Biometrics authenticator 78, processing circuitry 72, memory 74, processor 76, communication interface 70, the authentication fail message to the first UE 20*a*. In some embodiments, the first UE 20*a* comprises an autonomous machine configured to communicate with a second UE 20*b* via a voice session using the IMS. In some embodiments, the process includes receiving, from the first UE 20*a*, such as via Biometrics authenticator 78, processing circuitry 72, memory 74, processor 76, communication interface 70, a request to subscribe to a voice biometrics service provided by the AS 26; receiving, from the second UE 20*b*, a request to subscribe to the voice biometrics service provided by the AS 26; and obtaining, such as via Biometrics authenticator 78, processing circuitry 72, memory 74, processor 76, communication interface 70, the voiceprint sample from the user and binding the voiceprint sample to information associated with the first UE 20*a* and the second UE 20*b* in a voiceprint database. In some embodiments, the receiving the voiceprint of the user further includes receiving, such as via Biometrics authenticator 78, processing circuitry 72, memory 74, processor 76, communication interface 70, the voiceprint via a session initiation protocol, SIP, message during a voice call session between the first UE 20*a* and a second UE 20*b*.

Figure 9:
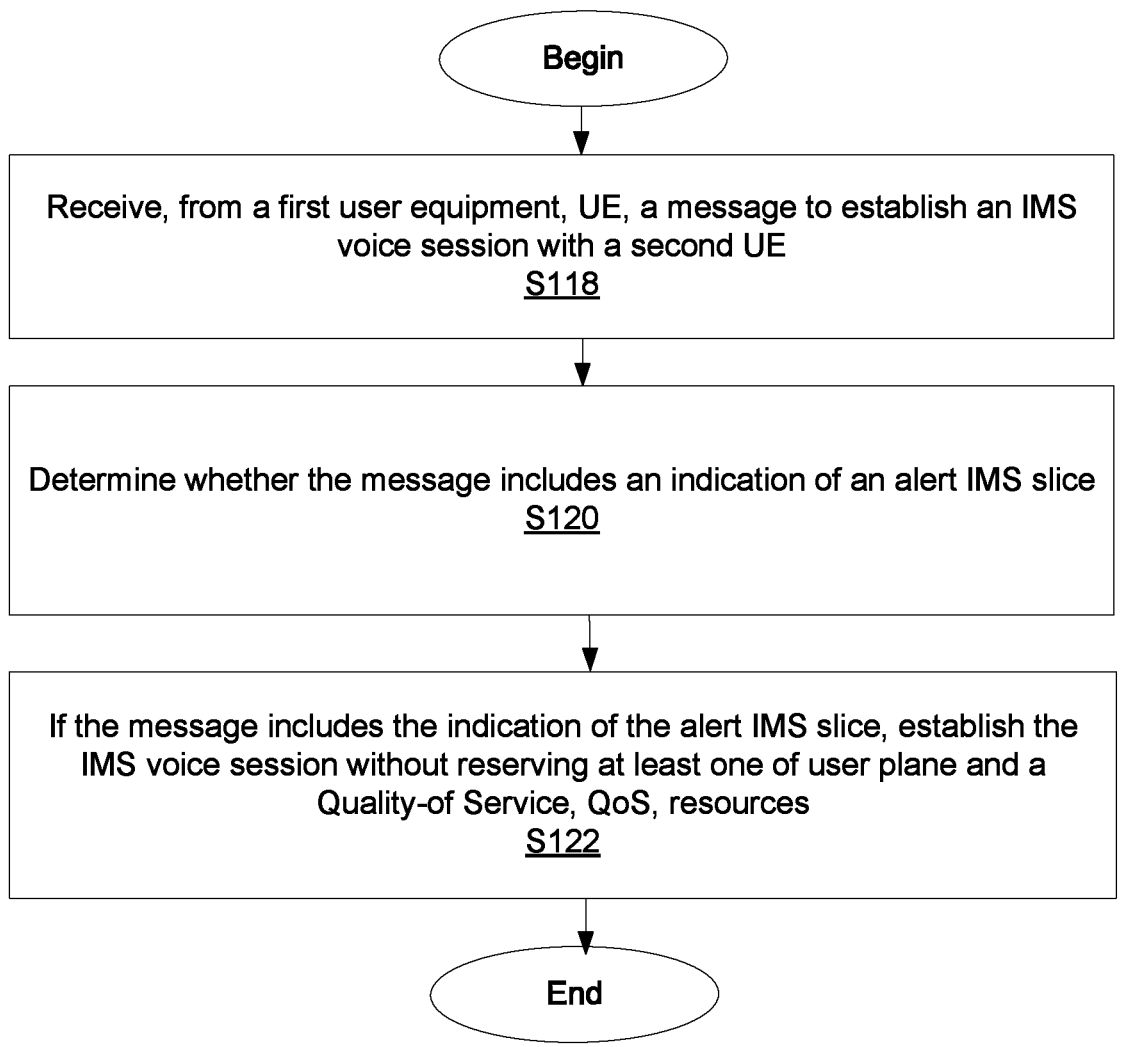
FIG. 9 is a flowchart of an exemplary process in a P-CSCF for Communication manager according to some embodiments of the present disclosure.

FIG. 9 is a flowchart of an exemplary process in a P-CSCF 22 for implementing one or more voice-related services according to some embodiments of the present disclosure. One or more Blocks and/or functions and/or methods performed by the P-CSCF 22 may be performed by one or more elements of P-CSCF 22 such as by Communication manager 58 in processing circuitry 52, memory 54, processor 56, communication interface 50, etc. according to the example process/method. The example process includes receiving (Block S118), such as via Communication manager 58, processing circuitry 52, memory 54, processor 56, communication interface 50, from a first user equipment, UE 20*a*, a message to establish an IMS voice session with a second UE 20*b*. The process includes determining (Block S120), such as via Communication manager 58, processing circuitry 52, memory 54, processor 56, communication interface 50, whether the message includes an indication of an alert IMS slice. The process includes, if the message includes the indication of the alert IMS slice, establishing (Block S122), such as via Communication manager 58, processing circuitry 52, memory 54, processor 56, communication interface 50, the IMS voice session without reserving at least one of user plane and a Quality-of Service, QoS, resources.

In some embodiments, the indication of the alert IMS slice includes at least one of: session description protocol, SDP, information included in a session initiation protocol, SIP, INVITE message, the SDP information indicating use of the alert IMS slice to establish the IMS voice session without the reserving; a feature tag indicating use of the alert IMS slice to establish the IMS voice session without the reserving; an SDP parameter indicating use of the alert IMS slice to establish the IMS voice session and a 0 bit audio rate in the SDP information.

Figure 10:
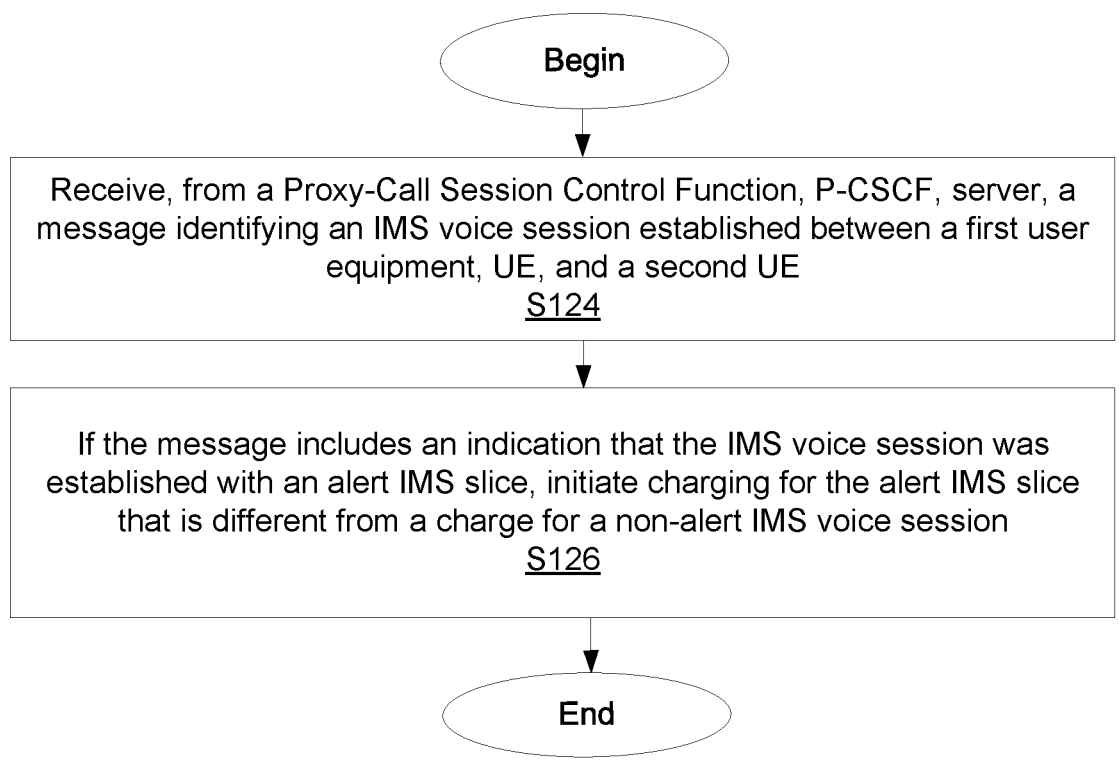
FIG. 10 is a flowchart of an exemplary process in a S-CSCF for Charging manager according to some embodiments of the present disclosure.

FIG. 10 is a flowchart of an exemplary process in a S-CSCF 24 for implementing one or more voice-related services according to some embodiments of the present disclosure. One or more Blocks and/or functions and/or methods performed by the S-CSCF 24 may be performed by one or more elements in S-CSCF 24 such as by Charging manager 68 in processing circuitry 62, memory 64, processor 66, communication interface 60, etc. according to the example process/method. The example process includes receiving (Block S124), such as via Charging manager 68, processing circuitry 62, memory 64, processor 66, communication interface 60, from a Proxy-Call Session Control Function, P-CSCF, server 22, a message identifying an IMS voice session established between a first user equipment, UE 20*a*, and a second UE 20*b*. The process includes if the message includes an indication that the IMS voice session was established with an alert IMS slice, initiating (Block S126), such as via Charging manager 68, processing circuitry 62, memory 64, processor 66, communication interface 60, charging for the alert IMS slice that is different from a charge for a non-alert IMS voice session. In some embodiments, the alert IMS slice corresponds to an IMS voice session without at least one of user plane and a Quality-of Service, QoS, resources.

Having generally described arrangements for IMS voice sessions between autonomous machines and/or voice support arrangements, a more detailed description of some of the embodiments are provided as follows with reference to FIGS. 11-15, and which may be implemented by UE 20, P-CSCF server 22, S-CSCF server 24 and/or AS 26.

Figure 11A:
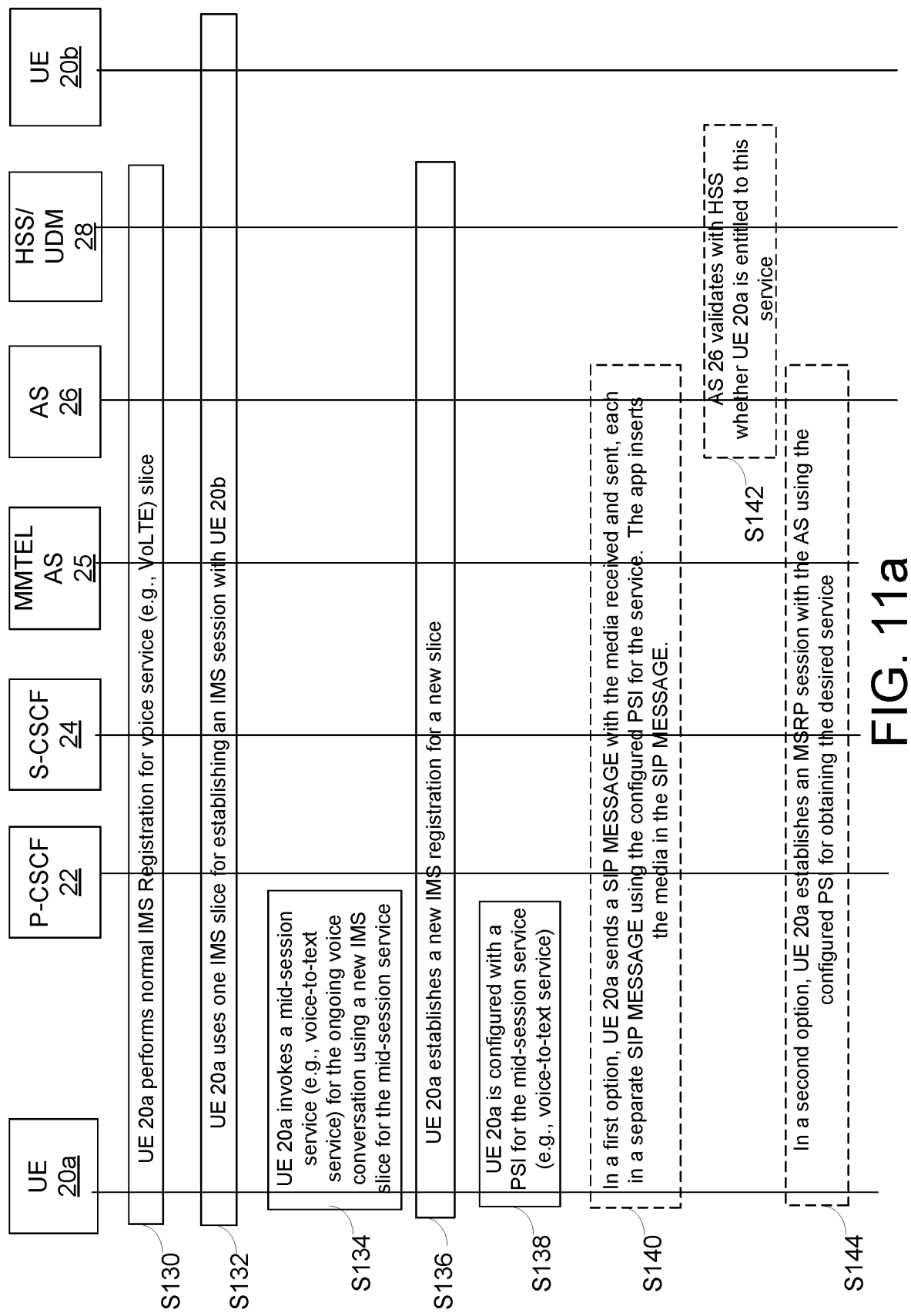
FIGS. 11a and 11b form a flowchart for an exemplary process for mid-session service invocation according to some embodiments of the present disclosure.
Figure 11B:
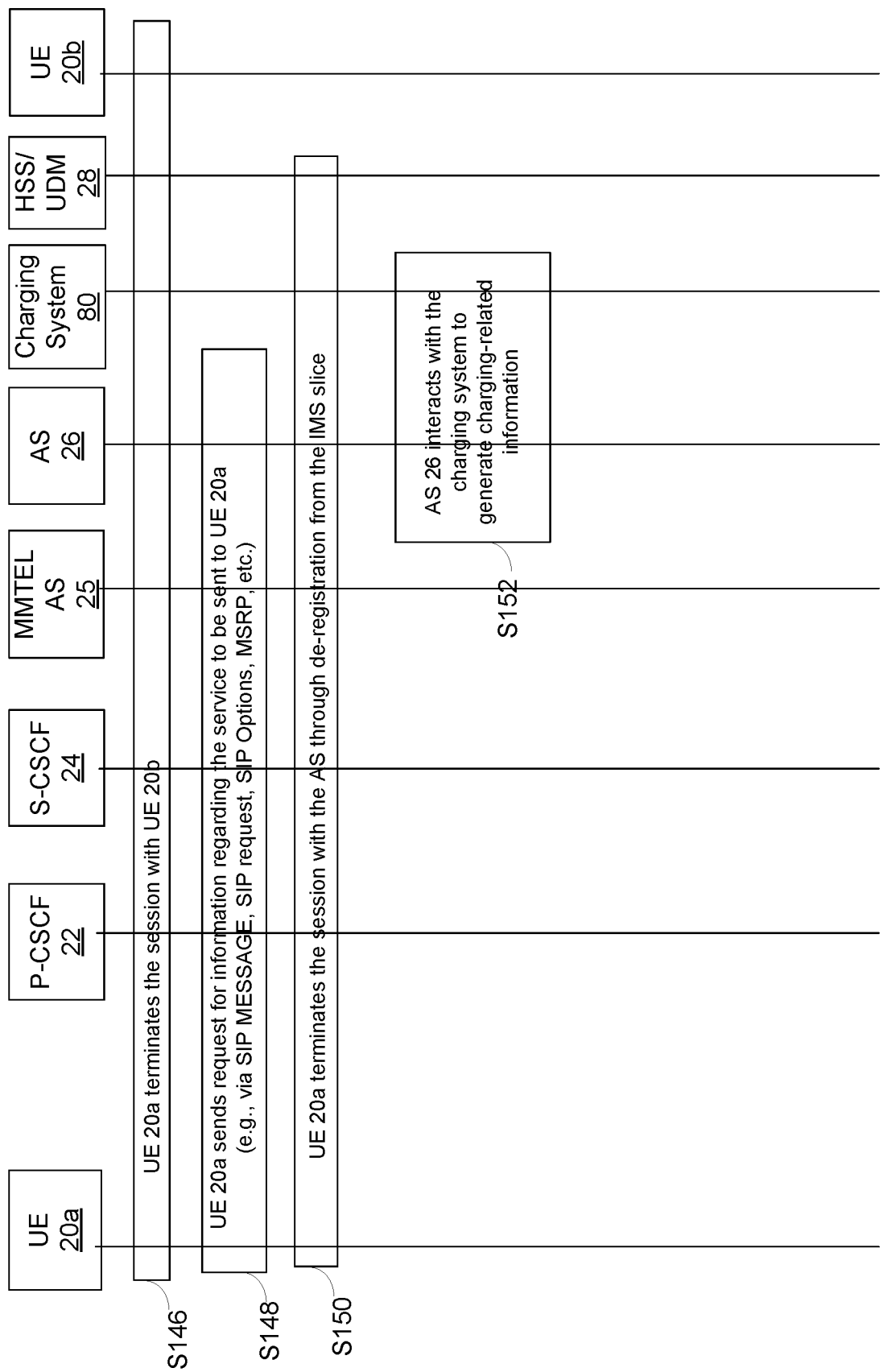

Mid-Session Voice Service Invocation Use Case:

FIGS. 11*a* and 11*b* form a flow diagram illustrating a call flow depicting how the system 10 can be used to invoke a real-time mid-session voice support service according to some embodiments of the present disclosure. FIG. 11*a* illustrates that in step S130, the UE 20*a* performs IMS registration for a voice service slice (e.g., VoLTE slice). In step S132, UE 20*a* uses one IMS slice (e.g., VoLTE slice) to establish an IMS session (e.g., for MMTEL purposes) with UE 20*b*. In step S134, UE 20*a* then invokes a mid-session service (e.g., voice support service such as voice-to-text service or translation, etc.) for the ongoing voice conversation by e.g., launching a new application ("app") that uses a new IMS slice for the mid-session service. In step S136, UE 20*a* performs a new IMS registration for the new IMS slice. In step S138, UE 20*a* is configured with a public service identity (PSI) for the mid-session service (e.g., voice-to-text service). It is noted that step S138 is not limited to occurrence after step S136 or before step S140. Step S138 can occur at any time. In step S140, according to a first embodiment, UE 20*a* sends a SIP MESSAGE having the media from the ongoing session. The app may insert the media bits for the requested service in the SIP MESSAGE and sends the SIP MESSAGE having the media bits to e.g., the AS 26 using the configured PSI for the service. The SIP MESSAGE may also include a direction of the stream so that the voice services on the incoming and outgoing audio stream can be properly separated by the AS 26. Several SIP MESSAGE transactions may be exchanged for the complete service to be performed on the ongoing telephony session. In some embodiments, further details of the exact contents of the SIP MESSAGE exchange may depend on the service implementation at the AS 26. IMS call control elements may be transparent to this exchange but may enable it.

The AS 26 may validate with HSS/UDM whether UE 20*a* is entitled to this service before providing the service, in step S142. In some embodiments, AS 26 may subscribe to the HSS when the UEs 20 registering for the feature tag are successfully registered; thus, validation may not be required in such embodiments.

As an alternative embodiment to step S140, in step S144 UE 20*a* may establish an MSRP session with the AS 26 using the configured PSI for obtaining the requested mid-session service. As yet another alternative embodiment (not shown), UE 20*a* may use the SIP OPTION message with a special package dedicated for the service. The particular IMS call control elements to use may be transparent to all the exchanges other than understanding and handling the feature tags of the service(s).

FIG. 11*b*, which is a continuation of the flow diagram depicted in FIG. 11*a*, illustrates the UE 20*a* terminating the ongoing voice/MMTEL session with UE 20*b* in step S146. In step S148, UE 20*a* retrieves the information related to the requested mid-session service. For example, UE 20*a* sends a request for information regarding the mid-session service (e.g., text of the voice conversation from the AS providing the voice-to-text service). Such request may be sent to AS 26 and/or the requested information may be sent to UE 20*a* via e.g., SIP MESSAGE, SIP request, SIP OPTIONS, MSRP session, etc. As with the service invocation, the details may depend on the AS 26 implementation and may be known only to AS 26 and UEs 20 using the service, i.e., transparent to IMS. In step S150, UE 20*a* terminates the session with the AS 26 through e.g., de-registration from the IMS slice that was established for the mid-session service from step S136. In step S152, the AS 26 interacts with a charging system 80 to generate charging-related information for billing for use of the service.

Figure 12:
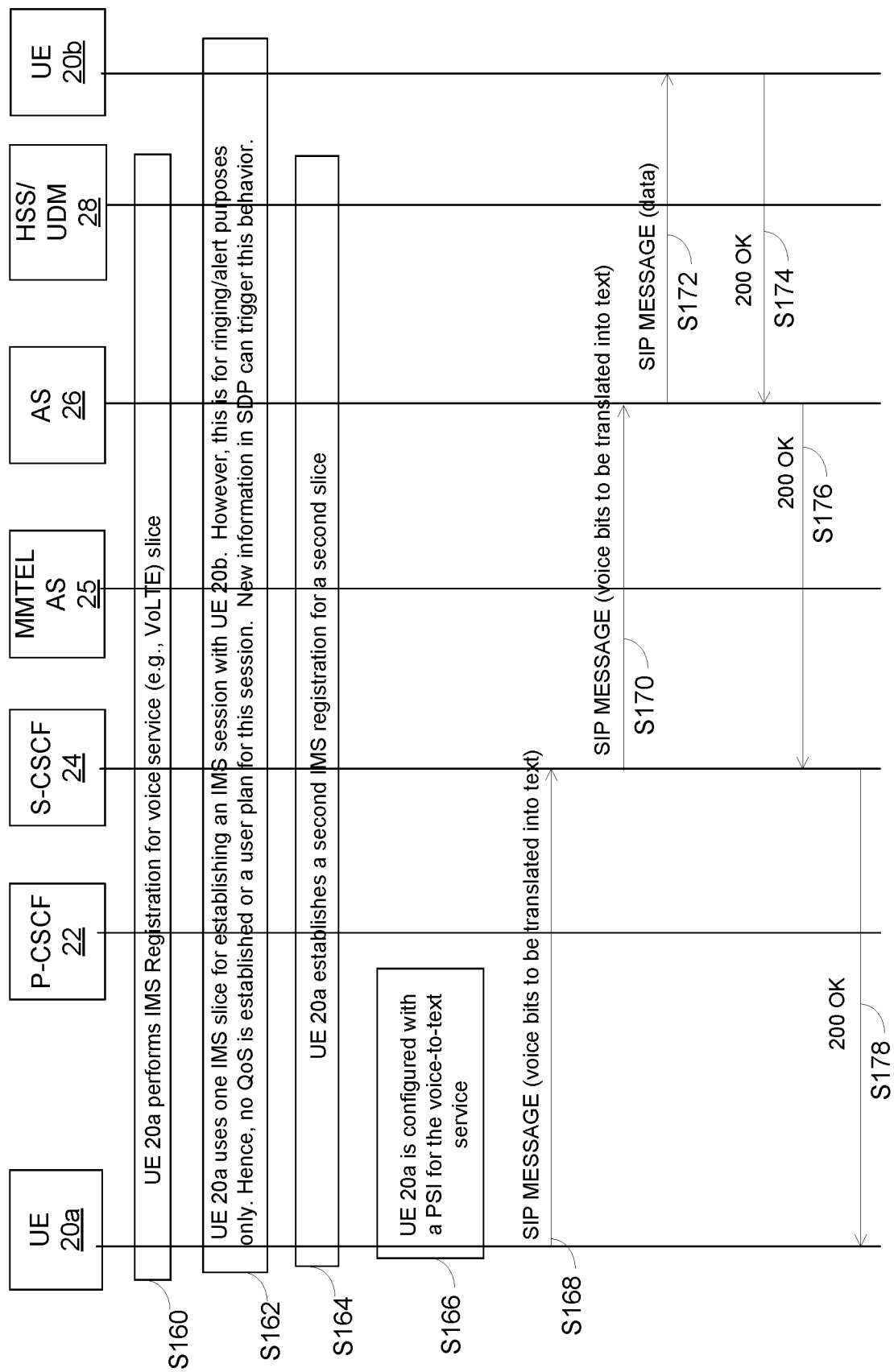
FIG. 12 is a flowchart for an exemplary process for autonomous voice communication services according to some embodiments of the present disclosure.

Autonomous Voice Conversion Services:

FIG. 12 is a call flow diagram for an example of an autonomous voice conversion service (e.g., voice-to-text). In the example, the IMS voice session is established only to alert the target UE 20*b* that there is an incoming pending message. Yet, the actual 'voice' is conveyed in a SIP MESSAGE (or other SIP message/communication) using a different IMS slice than the slice used for the alert, e.g., alert session/alert voice call. The SIP MESSAGE is shown in FIG. 12 as being sent to the AS 26, which may convert the voice bits from UE 20*a* to text and subsequently the AS 26 sends the text message to the target UE 20*b*, which can act accordingly. In this manner, in some embodiments, IMS slicing may be used to allow e.g., an autonomous machine to send a voice communication to another autonomous machine using a voice session.

In step S160, UE 20*a* starts the initial registration with IMS and uses an IMS slice for MMTEL purposes. In step S162, UE 20*a* initiates an IMS session with target UE 20*b*. However, in this example, UE 20*a* is using the IMS session only for alert purposes, i.e., to alert UE 20*b* that there will be an incoming message arriving in the future for the UE 20*b*. UE 20*b* may be configured to receive text. Hence, the P-CSCF 22 may be configured to forego establishing a user plane and/or QoS for this IMS session. Thus, the P-CSCF 22 may not interact with a Policy and Charging Rules Function (PCRF) for these purposes, which is new P-CSCF behavior (since P-CSCF typically interacts with PCRF for establishing an IMS voice session). Also, it should be noted that the IMS slice (e.g., MMTEL slice) used for the alert (e.g., IMS alert slice) is different from the IMS slice used for sending the voice-to-text data. A new Session Description Protocol (SDP) capability may be used to indicate to the P-CSCF 22 that no user plane or QoS is required for the IMS session. In some embodiments, to enable the P-CSCF 22 to recognize that no user plane or QoS is required for the IMS session, a feature tag may be used to indicate voice alerting, an SDP parameter may be used to indicate use of the alert IMS slice to establish the IMS voice session and/or a special audio configuration with 0 bit rate in the SDP may be used.

After the IMS alert session is successfully established without user plane or QoS as discussed above, in step S164, UE 20*a* may perform a second IMS registration for the service (e.g., voice-to-text service) and may include (e.g., in an IMS registration message) a feature tag for the voice-to-text conversion feature. In step S166, UE 20*a* is configured with a PSI for the service; this step can happen any time. In step S168, UE 20*a* uses the SIP MESSAGE option, sending a SIP MESSAGE that includes the actual voice bits to be converted to text by the AS 26. In other embodiments, UE 20*a* may use other arrangements for sending the voice bits (e.g., MSRP session, SIP OPTION, or other SIP message). In step S170, S-CSCF 24 forwards/sends the SIP MESSAGE to the AS 26 associated with the PSI and which is responsible for the voice-to-text conversion. The AS 26 may perform the conversion service and may, in step S172, send the text data (converted from the voice data) in a different SIP MESSAGE to the target UE 20*b*. UE 20*b* may receive the SIP MESSAGE having the text data and may interpret the text data and respond accordingly. In step S174, UE 20*b* sends a 200 OK response towards UE 20*a*. In step S176, AS 26 forwards the 200 OK message to S-CSCF 24 and, in step S178, S-CSCF 24 forwards the 200 OK message to UE 20*a*.

Figure 13:
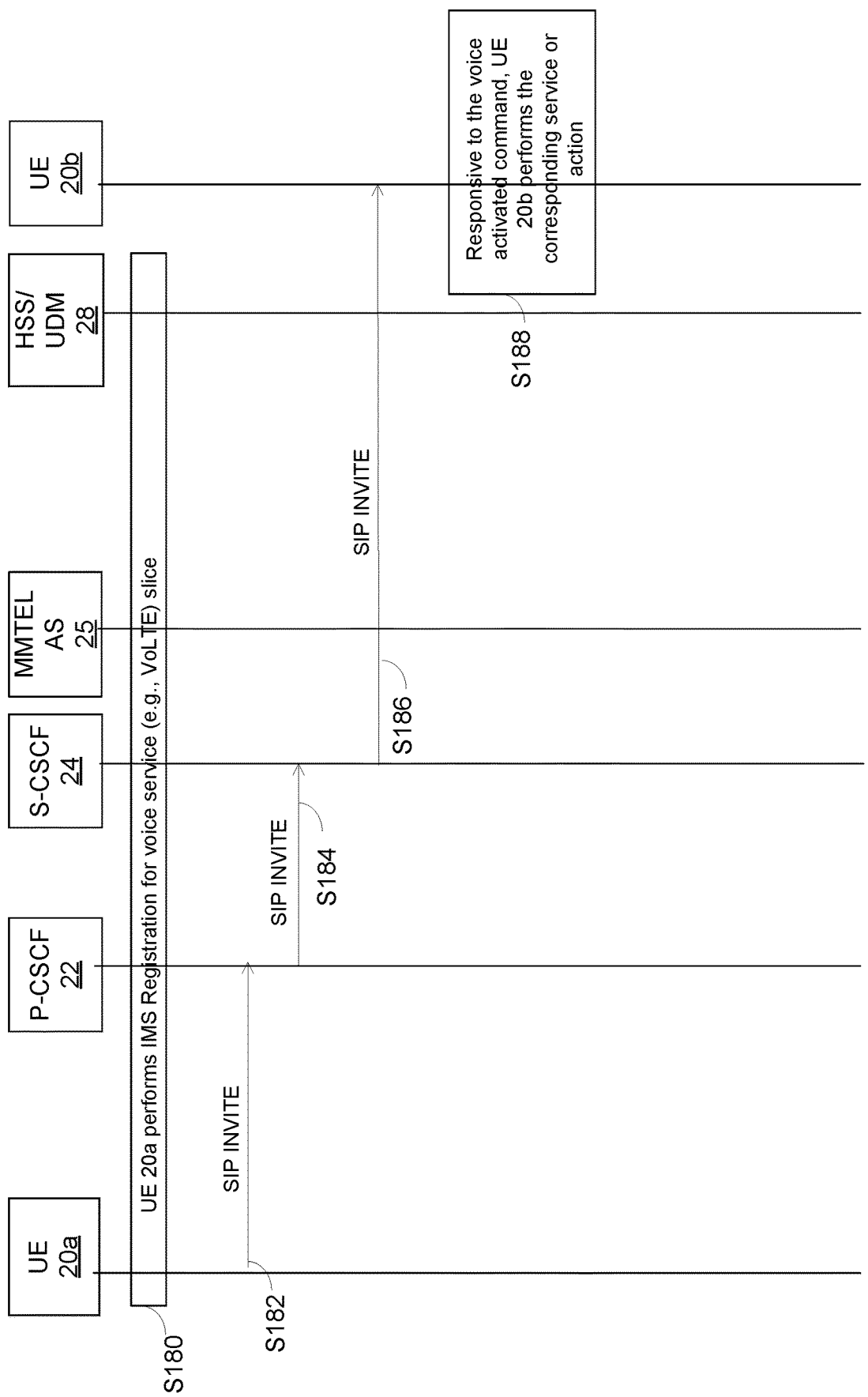
FIG. 13 is a flowchart for an exemplary process for autonomous voice activated services according to some embodiments of the present disclosure.

Autonomous Voice Activated Services:

FIG. 13 is a call flow diagram for an example of an autonomous voice activated service. As in the previous example describing autonomous voice conversion services with reference to FIG. 12, a voice session may be established to alert a target UE 20*b* that there is an incoming message, and may include the voice activated command within the voice session. The actual voice activation is shown in FIG. 13 as being communicated in a SIP INVITE message and using a SIP header dedicated for that purpose. UE 20*a* uses an IMS slice that supports the requested feature and the IMS registration for such IMS slice may include such a feature tag. As described with reference to FIG. 12, in the example in FIG. 13 the P-CSCF 22 may not create a user plane or QoS for the alert session.

In one example embodiment, in step S180, UE 20*a* starts the initial registration with IMS and uses an IMS slice for MMTEL. UE 20*a* may initiate an IMS session with target UE 20*b*. UE 20*a* may indicate that the IMS session is for alert purposes (e.g., to alert UE 20*b* of an incoming voice activated command). The P-CSCF 22 may be configured to forego establishing a user plane and/or QoS for this IMS session. Thus, the P-CSCF 22 may not interact with a Policy and Charging Rules Function (PCRF) for these purposes, which is new P-CSCF behavior (since P-CSCF typically interacts with PCRF for establishing an IMS voice session). A new Session Description Protocol (SDP) capability may be used to indicate to the P-CSCF 22 that no user plane or QoS is required for the IMS session. In some embodiments, to enable the P-CSCF 22 to recognize that no user plane or QoS is required for the IMS session, a feature tag may be used to indicate voice alerting, an SDP parameter may be used to indicate use of the alert IMS slice to establish the IMS voice session and/or a special audio configuration with 0 bit rate in the SDP may be used.

In step S182, UE 20a sends a SIP INVITE message towards target UE 20b. In some embodiments, the voice activated command may be included in a new SIP header. The SIP header may be configured to indicate one or more voice activated commands, which may be associated with e.g., commanding an autonomous machine. In steps S184 and S186, the SIP INVITE message may be forwarded from P-CSCF 22 to S-CSCF 24 and then from S-CSCF 24 to the target UE 20b, respectively. As a result of receiving and interpreting the voice activated command in the SIP header in the SIP INVITE message, in step S122, UE 20b may perform the commanded operation (e.g., open gate, not open gate, attempt to authenticate identification, other voice-activated operation, or any other responsive action or service). In other embodiments, the voice activated command may be indicated in other ways and/or sent using other SIP messages.

Voice Biometrics:

In some embodiments, some aspects of the voice biometrics authentication may proceed similar to the examples discussed above with reference to FIGS. 11-12 and therefore will not be described in detail herein again. For example, an IMS session is established for ringing purposes only as previously described. Identification information may be included in a new SIP header in a SIP INVITE message which establishes the IMS session, and that is transparent to an IMS. This SIP header can be compared against e.g., the P-Asserted-Identity received as one level of validation before acting. Additional authentication measures may be invoked using IMS slicing with the SIP MESSAGE via a configured PSI with the voice biometrics AS 26. The target UE 20b can validate the voice biometrics (e.g., voiceprint) via a second IMS slice using a SIP MESSAGE sent to the voice biometrics AS 26. The SIP MESSAGE may include or indicate voiceprint data used for validating the identity associated with UE 20a for UE 20b so that UE 20b may e.g., open a gate.

FIG. 14 illustrates a call flow diagram for an example voice biometrics authentication process according to some embodiments of the present disclosure. The example is described with reference to example UEs of a self-driving vehicle and a customer location-based robotic gate app; however, it should be understood that the UEs 20a and 20b may be any other UEs configured to communicate according to the techniques described herein.

In step S200, UE 20a (e.g., autonomous machine such as self-driving delivery vehicle) subscribes to the voice biometrics service provided by AS 26. In step S202, UE 20b (e.g., autonomous machine such as robotic gate) also subscribes to the voice biometrics service. In step S204, AS 26 binds the delivery vehicle with the customer location (e.g., binds subscription information of delivery vehicle with subscription information of the customer location at e.g., database (DB)). In step S206, an admin UE 20c (e.g., PC or smartphone associated with personnel at delivery company) calls or uses an interactive voice response (IVR) service to register and record voiceprint(s) for AS 26. In step S208, admin UE 20c provides voiceprint sample to UE 20a. In step S210, AS 26 may bind the delivery vehicle to the customer location with the voiceprint provided by admin UE 20c. In step S212, UE 20a may store a sample of the voiceprint for later use. In step S214, UE 20a may set-up an alert voice call to UE 20b when UE 20a reaches the customer location. Setting up the alert voice call for alert purposes has already been discussed herein above and therefore will not be repeated here. In step S216, UE 20a may indicate, play and/or otherwise communicate the voiceprint during an ongoing voice session. Such voiceprint may be provided to AS 26 directly by UE 20a, or from another entity that requests validation of the voice sample (e.g., UE 20b). In other embodiments, the voiceprint may be communicated by UE 20a to target UE 20b and target UE 20b may request the biometrics validation from AS 26. Stated another way, although FIG. 14 shows a call flow from UE 20a to AS 26 in step S216, it should be understood that AS 26 may obtain the voiceprint in different ways (e.g., from UE 20b, from UE 20a, etc.)

In step S218, AS 26 verifies the voiceprint against samples stored at the biometric service DB. In step S220, if a match is found, AS 26 determines that the validation is successful and may, in step S222, send a validation successful message indication to UE 20b, as well as, a validation success message to UE 20a in step S224. Responsive to step S226, UE 20b performs an operation/action such as providing access and opening the gate for the delivery truck UE 20a.

Alternatively, in step S228, AS 26 may determine that a match is not found and therefore the validation has failed. Responsive to step S228, AS 26 may send a validation failure message to UE 20b in step S230 and in step S232, UE 20b denies access and the gate remains closed. In step S234, AS 26 sends a validation failure feedback message to UE 20a.

Figure 15A:
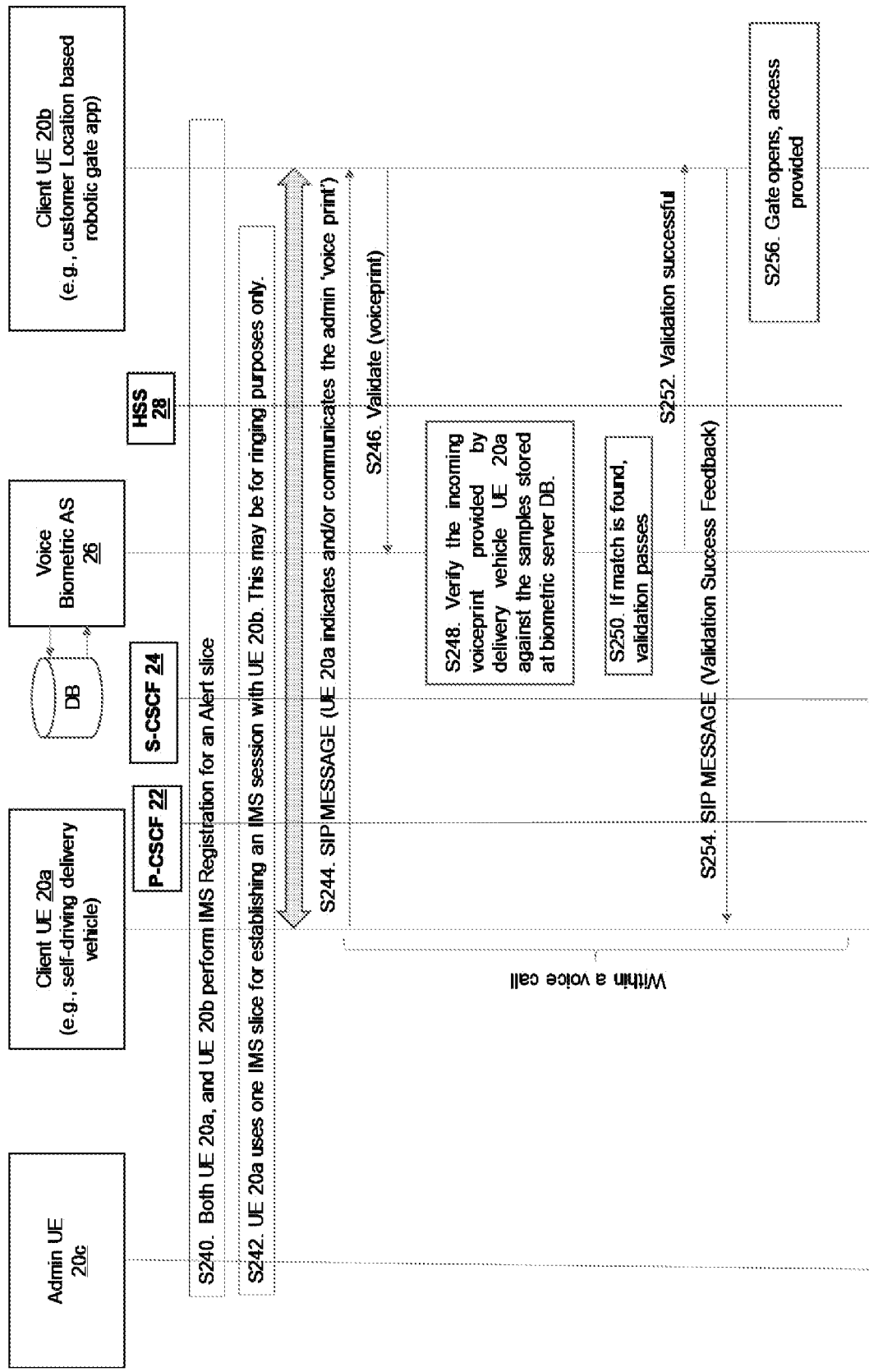
FIGS. 15a and 15b form a flowchart for yet another exemplary process for voice biometrics services according to some embodiments of the present disclosure.
Figure 15B:
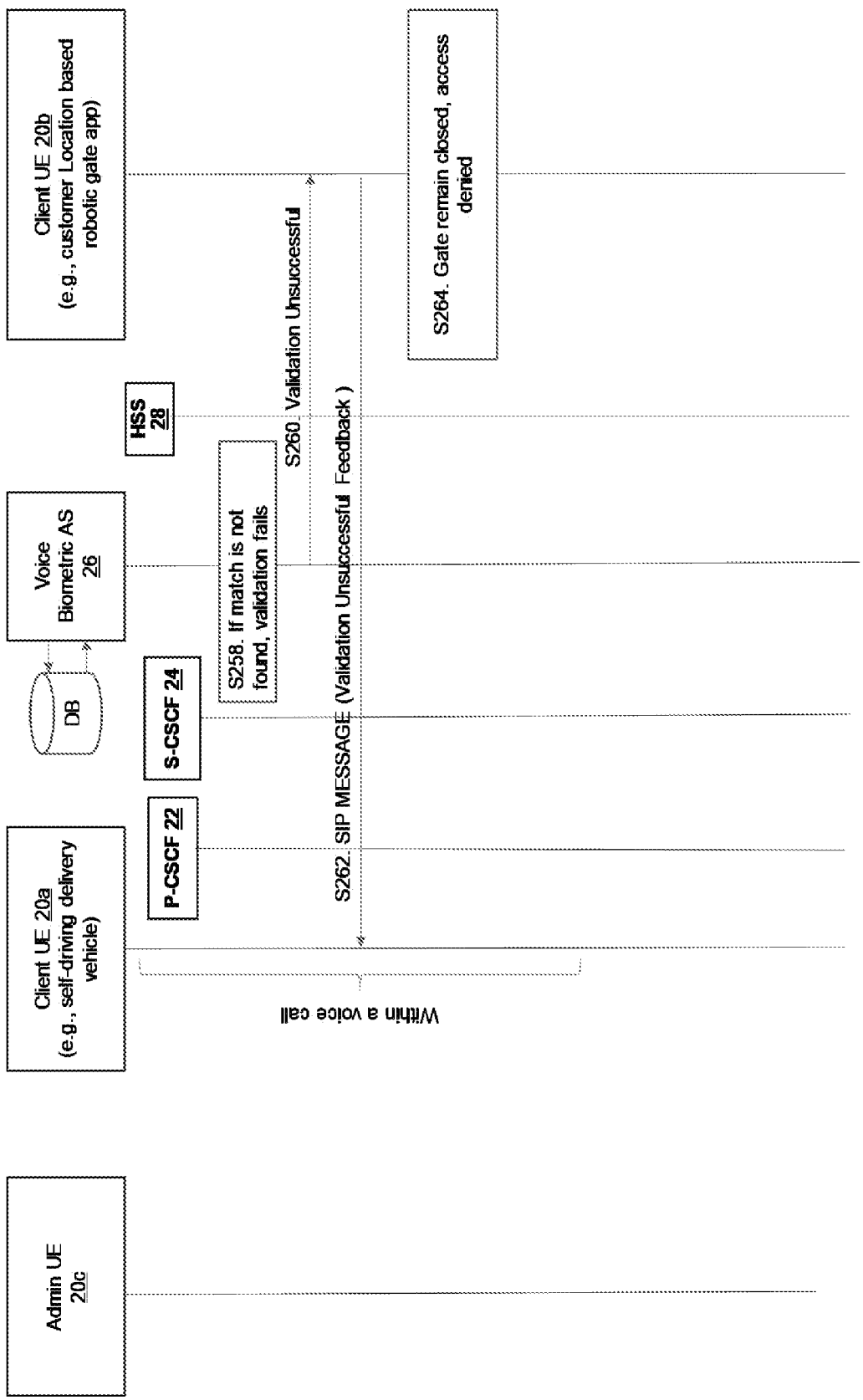

FIGS. 15a-15b form a flow diagram illustrating a call flow for another example voice biometrics authentication process according to some embodiments of the present disclosure. FIGS. 15a-15b may be considered to illustrate an example voice biometrics authentication procedure using an example context (e.g., automated delivery of goods without human intervention). FIG. 15a illustrates that in step S240, UE 20a and UE 20b perform IMS registration for the alert slice, as discussed herein above. In step S242, UE 20a uses one IMS slice for establishing an IMS session with UE 20b; however, as discussed herein above, this IMS session may be for ringing/alert purposes. Thus, the P-CSCF 22 may recognize the IMS session as an alert IMS session and therefore forego reserving QoS or user plane. The S-CSCF 24 may further initiate charging for the session as an alert session only (as opposed to a conventional voice call session).

In step S244, UE 20a sends a SIP MESSAGE that indicates and/or communicates the voiceprint (e.g., provided by admin UE 20c in step S208 in FIG. 14). The indication and/or communication of the voiceprint may be provided by e.g., communicating the voiceprint, sending a voiceprint file or providing other information demonstrating that UE 20a is in possession of an authentic voiceprint sample. The SIP MESSAGE may be sent to UE 20b. In step S246, UE 20b sends a validation request message to voice biometrics AS 26. The validation request message may include the voiceprint and/or other voiceprint information provided by UE 20a e.g., in step S244. In step S248, AS 26 verifies the voiceprint against the samples stored at the biometrics AS DB, and AS 26 may optionally verify whether the voiceprint authentication is bound to UE 20*b* (e.g., if UE 20*b* made this request in S246, and included UE's 20*b* identity and/or UE's 20*a* identity in such request). For example, UE 20*b* may request from AS 26 that only certain UE's be permitted through the gate, such as, for example, UE 20*a* and UE 20*c*. Thus, in the request for authentication in e.g., step S246, AS 26 may determine whether UE 20*a* is bound to UE 20*b* (e.g., is a permitted UE) and if yes, AS 26 can then determine whether the voiceprint matches the voiceprint sample stored at the biometrics AS DB. On the other hand, if the UE identity included in the request is not bound to UE 20*b*, AS 26 may, for example, notify UE 20*b* that the UE associated with the identity is not bound to UE 20*b* and, in some embodiments, AS 26 may fail the authentication and/or may allow UE 20*b* to decide whether to proceed with the voiceprint authentication.

AS 26 determines whether the voiceprint authenticates UE 20*a*. For example, in step S250, AS 26 determines that a match is found and the validation passes. In step S252, AS 26 sends a validation success message to UE 20*b*. In step S254, responsive to the validation success message from AS 26, UE 20*b* may send a SIP MESSAGE having a validation success feedback indication to UE 20*a* and, in step S256, UE 20*b* may open the gate and provide access to the delivery vehicle UE 20*a*. The 200 OK response to the SIP MESSAGE is not shown for the sake of brevity.

Alternatively, as shown in FIG. 15*b*, AS 26 determines that a match is not found and therefore the validation fails in step S258. Responsive to the failure determination, AS 26 sends a validation unsuccessful message indication to UE 20*b* in step S260. Thus, UE 20*b* may send a SIP MESSAGE to UE 20*a* in step S262. The SIP MESSAGE may include a validation unsuccessful feedback indication. In step S264, responsive to the failure determination, access may be denied to the delivery vehicle UE 20*a* and the gate may remain closed. As indicated in FIGS. 15*a*-15*b*, the messages in steps S244 through steps S262 may occur within a voice call session.

It should be understood that although the example embodiments discussed herein may use one or another type of SIP message, the techniques disclosed herein may be used with other types of SIP messages or other communication protocols to support Internet Protocol (IP) Multimedia Subsystem (IMS) voice sessions between autonomous machines and/or voice support services according to the techniques provided in this disclosure.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first user equipment for authenticating the first UE via an Internet Protocol, IP, Multimedia Subsystem, IMS, the first UE comprising processing circuitry having a processor and a memory, the memory containing instructions executable by the processor to configure the first UE to:
   communicate an alert voice call to a second UE for initiating authentication of the first UE;
   communicate, via an IMS slice, a voiceprint of a user for the authentication of the first UE; and
   based at least in part on an analysis of the voiceprint, receive one of an authentication success message and an authentication fail message, wherein the memory contains further instructions executable by the processor to configure the first UE to communicate the alert voice call to the second UE by configuring the first UE to:
   communicate the alert voice call to the second UE for authenticating the first UE using an alert IMS slice, the alert IMS slice corresponding to an IMS voice session without at least one of user plane and a Quality-of Service, QoS, resources.

2. The first UE of claim 1, wherein at least one of the first UE and the second UE comprises an autonomous machine configured to communicate via a voice session using the IMS.

3. The first UE of claim 1, wherein the memory contains further instructions executable by the processor to configure the first UE to one or more of:
   register with the IMS for an alert IMS slice;
   receive and store the voiceprint of the user for authenticating the first UE via the IMS; and
   subscribe to an application server, AS, the AS providing a voice biometrics service for authenticating the first UE to the second UE.

4. The first UE of claim 1, wherein the memory contains further instructions executable by the processor to configure the first UE to communicate the voiceprint of the user by configuring the first UE to:
   communicate the voiceprint using a session initiation protocol, SIP, message during a voice call session with the second UE.

5. The first UE of claim 1, wherein the memory contains further instructions executable by the processor to configure the first UE to:
   if the authentication success message is received, expect the second UE to perform a first operation; and
   if the authentication fail message is received, expect the second UE to perform a second operation, different from the first operation.

6. A method for an Application Server, AS, in an Internet Protocol, IP, Multimedia Subsystem, IMS, the method comprising:
   receiving, via an IMS slice, a voiceprint of a user;
   comparing the received voiceprint to a voiceprint sample, the voiceprint sample associated with a first user equipment, UE, and
   based at least in part on the comparison, communicating one of an authentication success message and an authentication fail message, wherein the first UE is configured to communicate an alert voice call to a second UE for authenticating the first UE using the alert IMS slice, the alert IMS slice corresponding to an IMS voice session without at least one of user plane and a Quality-of Service, QoS, resources.

7. The method of claim 6, wherein the comparing the received voiceprint to the voiceprint sample further comprises:
   comparing the received voiceprint to the voiceprint sample based at least in part on a condition, the condition including whether the first UE is bound to the second UE, the second UE requesting authentication; and
   if the condition is met:
      accessing the voiceprint sample associated with the first UE from a voiceprint database; and
      analyzing the received voiceprint to determine whether at least one vocal characteristic of the received voiceprint matches a corresponding at least one vocal characteristic of the voiceprint sample.

8. The method of claim 6, wherein the communicating further comprises:
   if the received voiceprint matches the voiceprint sample, communicating the authentication success message to the first UE, and
   if the received voiceprint does not match the voiceprint sample, communicating the authentication fail message to the first UE.

9. The method of claim 6, wherein the first UE comprises an autonomous machine configured to communicate with the second UE via a voice session using the IMS.

10. The method of claim 9, further comprising:
    receiving, from the first UE, a request to subscribe to a voice biometrics service provided by the AS;
    receiving, from the second UE, a request to subscribe to the voice biometrics service provided by the AS; and
    obtaining the voiceprint sample from the user and binding the voiceprint sample to information associated with the first UE and the second UE in a voiceprint database.

11. The method of claim 6, wherein the receiving the voiceprint of the user further comprises receiving the voiceprint via a session initiation protocol, SIP, message during a voice call session between the first UE and the second UE.

12. A method for a Proxy-Call Session Control Function, P-CSCF, server for an Internet Protocol, IP, Multimedia Subsystem, IMS, the method comprising:
    receiving, from a first user equipment, UE, a message to establish an IMS voice session with a second UE,
    determining whether the message includes an indication of an alert IMS slice; and
    if the message includes the indication of the alert IMS slice, establishing the IMS voice session without reserving at least one of user plane and a Quality-of Service, QoS, resources.

13. The method of claim 12, wherein the indication of the alert IMS slice comprises at least one of:
    session description protocol, SDP, information included in a session initiation protocol, SIP, INVITE message, the SDP information indicating use of the alert IMS slice to establish the IMS voice session without the reserving;
    a feature tag indicating use of the alert IMS slice to establish the IMS voice session without the reserving;
    an SDP parameter indicating use of the alert IMS slice to establish the IMS voice session; and
    a 0 bit audio rate in the SDP information.

* * * * *